United States Patent
Li et al.

(10) Patent No.: US 12,465,277 B2
(45) Date of Patent: Nov. 11, 2025

(54) MILD COGNITIVE IMPAIRMENT DETECTION AND PREDICTION SYSTEM

(71) Applicant: Board of Trustees of Michigan State University, East Lansing, MI (US)

(72) Inventors: Tongtong Li, Okemos, MI (US); Jinxian Deng, East Lansing, MI (US); Boxin Sun, East Lansing, MI (US); Bruno Giordani, Ann Arbor, MI (US); Mingyan Liu, Ann Arbor, MI (US); Voyko Kavcic, Dearborn, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 18/621,361

(22) Filed: Mar. 29, 2024

(65) Prior Publication Data

US 2025/0302367 A1 Oct. 2, 2025

(51) Int. Cl.
| | |
|---|---|
| A61B 5/00 | (2006.01) |
| A61B 5/369 | (2021.01) |
| A61B 5/372 | (2021.01) |
| A61B 5/374 | (2021.01) |
| A61B 5/384 | (2021.01) |

(52) U.S. Cl.
CPC ............ *A61B 5/4064* (2013.01); *A61B 5/369* (2021.01); *A61B 5/374* (2021.01); *A61B 5/384* (2021.01); *A61B 5/7203* (2013.01)

(58) Field of Classification Search
None
See application file for complete search history.

(56) References Cited

PUBLICATIONS

Cheng et al. Research Progress on Analysis Methods and Applications of Electroencephalogram Signals Based on Dynamic Functional Connectivity Analysis. 2023 16th International Congress on Image and Signal Processing, BioMedical Engineering and Informatics. (Year: 2023).*

Sahib et al. Evaluating the impact of fast-fMRI on dynamic functional connectivity in an event-based paradigm. PLOS One. Jan. 22, 2018. (Year: 2018).*

(Continued)

*Primary Examiner* — Etsub D Berhanu
(74) *Attorney, Agent, or Firm* — Harness, Dickey & Pierce, PLC

(57) ABSTRACT

A method and system for assessing brain impairment includes generating electroencephalogram (EEG) signals from a plurality of electrodes, removing artifacts from the EEG signals to generate artifact reduced signals, generating current source density signals from the artifact reduced signals, performing multiscale analysis of dynamic functional connectivity of a brain based on the current source density signals using a plurality of different sized time windows, generating hard classifiers for each of the plurality of different size time windows, selecting classifiers from the hard classifiers to form selected classifiers, performing majority voting on a discrimination of normal cognition and mild cognitive impairment using the selected classifiers, generating an EEG-based health score of overall brain activity based on majority voting of the selected classifiers and generating a display corresponding to the health score of brain activity.

10 Claims, 15 Drawing Sheets

(56) References Cited

PUBLICATIONS

Song et al. An EEG-based systematic explainable detection framework for probing and localizing abnormal patterns in Alzheimer's disease. Journal of Neural Engineering. 19 (2022). (Year: 2022).*
Zverko et al. Dynamic Connectivity Analysis Using Adaptive Window Size. Sensors. 2022, 22, 5162. (Year: 2022).*
Qin Q, Qu J, Yin Y, et al. Unsupervised machine learning model to predict cognitive impairment in subcortical ischemic vascular disease [published online ahead of print, Feb. 14, 2023]. Alzheimers Dement. 2023;10.1002/alz.12971. doi:10.1002/alz.12971.
Wang, Wang Z, Tang Z, Zhu Y, et al. AD risk score for the early phases of disease based on unsupervised machine learning. Alzheimers Dement. 2020;16(11):1524-1533. doi:10.1002/alz.12140.
Knopman DS, Amieva H, Petersen RC, et al. Alzheimer disease. Nat Rev Dis Primers. 2021;7(1):33. Published May 13, 2021. doi:10.1038/s41572-021-00269-y.
Qiu S, Miller MI, Joshi PS, et al. Multimodal deep learning for Alzheimer's disease dementia assessment. Nat Commun. 2022;13(1):3404. Published Jun. 20, 2022. doi:10.1038/s41467-022-31037-5.
Huang Y, Sun X, Jiang H, et al. A machine learning approach to brain epigenetic analysis reveals kinases associated with Alzheimer's disease. Nat Commun. 2021;12(1):4472. Published Jul. 22, 2021. doi:10.1038/s41467-021-24710-8.
Yang Z, Nasrallah IM, Shou H, et al. A deep learning framework identifies dimensional representations of Alzheimer's Disease from brain structure. Nat Commun. 2021;12(1):7065. Published Dec. 3, 2021. doi:10.1038/s41467-021-26703-z.
Rodriguez S, Hug C, Todorov P, et al. Machine learning identifies candidates for drug repurposing in Alzheimer's disease. Nat Commun. 2021;12(1):1033. Published Feb. 15, 2021. doi:10.1038/s41467-021-21330-0.
Steenland K, Goldstein FC, Levey A, Wharton W. A Meta-Analysis of Alzheimer's Disease Incidence and Prevalence Comparing African-Americans and Caucasians. J Alzheimers Dis. 2016;50(1):71-76. doi:10.3233/JAD-150778.
Kunkle BW, Schmidt M, Klein HU, et al. Novel Alzheimer Disease Risk Loci and Pathways in African American Individuals Using the African Genome Resources Panel: A Meta-analysis [published correction appears in JAMA Neurol. May 1, 2021;78(5):620]. JAMA Neurol. 2021;78(1):102-113. doi:10.1001/jamaneurol.2020.3536.
Babiloni C, Arakaki X, Azami H, et al. Measures of resting state EEG rhythms for clinical trials in Alzheimer's disease: Recommendations of an expert panel. Alzheimers Dement. 2021;17(9):1528-1553. doi: 10.1002/alz.12311.
Cecchetti G, Agosta F, Basaia S, et al. Resting-state electroencephalographic biomarkers of Alzheimer's disease. Neuroimage Clin. 2021;31:102711. doi:10.1016/j.nicl.2021.102711.
Ranasinghe KG, Kudo K, Hinkley L, et al. Neuronal synchrony abnormalities associated with subclinical epileptiform activity in early-onset Alzheimer's disease. Brain. 2022; 145(2):744-753. doi:10.1093/brain/awab442.
Meghdadi AH, Stevanovi? Kari? M, McConnell M, et al. Resting state EEG biomarkers of cognitive decline associated with Alzheimer's disease and mild cognitive impairment. PLoS One. 2021;16(2):e0244180. Published Feb. 5, 2021. doi:10.1371/journal.pone.0244180.
Jiao, B., Li, R., Zhou, H. et al. Neural biomarker diagnosis and prediction to mild cognitive impairment and Alzheimer's disease using EEG technology. Alz Res Therapy 15, 32 (2023). https://doi.org/10.1186/s13195-023-01181-1.
Kavcic V, Daugherty AM, Giordani B. Post-task modulation of resting state EEG differentiates MCI patients from controls. Alzheimers Dement (Amst). 2021;13(1):e12153. Published Feb. 20, 2021. doi:10.1002/dad2.12153.
Rossini PM, Miraglia F, Vecchio F. Early dementia diagnosis, MCI-to-dementia risk prediction, and the role of machine learning methods for feature extraction from integrated biomarkers, in particular for EEG signal analysis. Alzheimers Dement. 2022;18(12):2699-2706. doi:10.1002/alz.12645.
Blinowska KJ, Rakowski F, Kaminski M, et al. Functional and effective brain connectivity for discrimination between Alzheimer's patients and healthy individuals: A study on resting state EEG rhythms. Clin Neurophysiol. 2017; 128(4):667-680. doi: 10.1016/j.clinph.2016.10.002.
McBride JC, Zhao X, Munro NB, et al. Spectral and complexity analysis of scalp EEG characteristics for mild cognitive impairment and early Alzheimer's disease. Comput Methods Programs Biomed. 2014;114(2):153-163. doi:10.1016/j.cmpb.2014.01.019.
Perez-Valero E, Lopez-Gordo MA, Gutiérrez CM, Carrera-Muñoz I, Vilchez-Carrillo RM. A self-driven approach for multi-class discrimination in Alzheimer's disease based on wearable EEG. Comput Methods Programs Biomed. 2022;220:106841. doi: 10.1016/j.cmpb.2022.106841.
Siuly S, Alcin OF, Kabir E, et al. A New Framework for Automatic Detection of Patients With Mild Cognitive Impairment Using Resting-State EEG Signals. IEEE Trans Neural Syst Rehabil Eng. 2020;28(9):1966-1976. doi:10.1109/TNSRE.2020.3013429.
Yin J, Cao J, Siuly S, Wang H. An integrated MCI detection framework based on spectral-temporal analysis. International Journal of Automation and Computing. 2019; 16(6):786-799. doi: 10.1007/s11633-019-1197-4.
Movahed RA, Rezaeian M. Automatic Diagnosis of Mild Cognitive Impairment Based on Spectral, Functional Connectivity, and Nonlinear EEG-Based Features. Comput Math Methods Med. 2022;2022:2014001. Published Aug. 11, 2022. doi:10.1155/2022/2014001.
Araújo T, Teixeira JP, Rodrigues PM. Smart-Data-Driven System for Alzheimer Disease Detection through Electroencephalographic Signals. Bioengineering (Basel). 2022;9(4):141. Published Mar. 28, 2022. doi: 10.3390/bioengineering9040141.
Kashefpoor M, Rabbani H, Barekatain M. Automatic Diagnosis of Mild Cognitive Impairment Using Electroencephalogram Spectral Features. J Med Signals Sens. 2016;6(1):25-32.
Jiang J, Yan Z, Sheng C, et al. A Novel Detection Tool for Mild Cognitive Impairment Patients Based on Eye Movement and Electroencephalogram. J Alzheimers Dis. 2019;72(2):389-399. doi: 10.3233/JAD-190628.
Wang X, Michaelis ML, Michaelis EK. Functional genomics of brain aging and Alzheimer's disease: focus on selective neuronal vulnerability. Curr Genomics. 2010;11(8):618-633. doi: 10.2174/138920210793360943.
Cui X, Xiang J, Guo H, et al. Classification of Alzheimer's Disease, Mild Cognitive Impairment, and Normal Controls With Subnetwork Selection and Graph Kernel Principal Component Analysis Based on Minimum Spanning Tree Brain Functional Network. Front Comput Neurosci. 2018; 12:31. Published May 9, 2018. doi: 10.3389/fncom.2018.00031 Frontiers in computational neuroscience (2018), 12, 31. https://doi.org/10.3389/fncom.2018.00031.
Zhang D, Wang Y, Zhou L, Yuan H, Shen D; Alzheimer's Disease Neuroimaging Initiative. Multimodal classification of Alzheimer's disease and mild cognitive impairment. Neuroimage. 2011;55(3):856-867. doi:10.1016/j.neuroimage.2011.01.008.
Liu F, Zhou L, Shen C, Yin J. Multiple kernel learning in the primal for multimodal Alzheimer's disease classification. IEEE J Biomed Health Inform. 2014; 18(3):984-990. doi: 10.1109/JBHI.2013.2285378.
Xu L, Wu X, Li R, et al. Prediction of Progressive Mild Cognitive Impairment by Multi-Modal Neuroimaging Biomarkers. J Alzheimers Dis. 2016;51(4):1045-1056. doi: 10.3233/JAD-151010.
Li Q, Wu X, Xu L, Chen K, Yao L, Li R. Multi-modal discriminative dictionary learning for Alzheimer's disease and mild cognitive impairment. Comput Methods Programs Biomed. 2017;150:1-8. doi:10.1016/j.cmpb.2017.07.003.
Fu H, Hardy J, Duff KE. Selective vulnerability in neurodegenerative diseases. Nat Neurosci. 2018;21(10):1350-1358. doi:10.1038/s41593-018-0221-2.
Hata M, Kazui H, Tanaka T, et al. Functional connectivity assessed by resting state EEG correlates with cognitive decline of Alzheimer's disease—An eLORETA study. Clin Neurophysiol. 2016; 127(2):1269-1278. doi:10.1016/j.clinph.2015.10.030.

(56) References Cited

PUBLICATIONS

Smailovic U, Koenig T, Savitcheva I, et al. Regional Disconnection in Alzheimer Dementia and Amyloid-Positive Mild Cognitive Impairment: Association Between EEG Functional Connectivity and Brain Glucose Metabolism. *Brain Connect*. 2020; 10(10):555-565. doi:10.1089/brain.2020.0785.

Lin Q, Rosenberg MD, Yoo K, Hsu TW, O'Connell TP, Chun MM. Resting-State Functional Connectivity Predicts Cognitive Impairment Related to Alzheimer's Disease. *Front Aging Neurosci*. 2018; 10:94. Published Apr. 13, 2018. doi:10.3389/fnagi.2018.00094.

Zhu DC, Majumdar S, Korolev IO, Berger KL, Bozoki AC. Alzheimer's disease and amnestic mild cognitive impairment weaken connections within the default-mode network: a multi-modal imaging study. *J Alzheimers Dis*. 2013;34(4):969-984. doi:10.3233/JAD-121879.

Hutchison RM, Womelsdorf T, Allen EA, et al. Dynamic functional connectivity: promise, issues, and interpretations. *Neuroimage*. 2013;80:360-378. doi:10.1016/j.neuroimage.2013.05.079.

Allen EA, Damaraju E, Plis SM, Erhardt EB, Eichele T, Calhoun VD. Tracking whole-brain connectivity dynamics in the resting state. *Cereb Cortex*. 2014;24(3):663-676. doi:10.1093/cercor/bhs352.

Schumacher J, Peraza LR, Firbank M, et al. Dynamic functional connectivity changes in dementia with Lewy bodies and Alzheimer's disease. *Neuroimage Clin*. 2019;22:101812. doi:10.1016/j.nicl.2019.101812.

Fiorenzato E, Strafella AP, Kim J, et al. Dynamic functional connectivity changes associated with dementia in Parkinson's disease. *Brain*. 2019;142(9):2860-2872. doi:10.1093/brain/awz192.

Preti MG, Bolton TA, Van De Ville D. The dynamic functional connectome: State-of-the-art and perspectives. *Neuroimage*. 2017;160:41-54. doi:10.1016/j.neuroimage.2016.12.061.

Liang Y, Zheng Y, Renli B, Zhu DC, Yu F, Li T. Dynamic functional connectivity fading analysis and classification of alzheimer's disease, mild cognitive impairment and normal control subjects based on resting-state fmri data. *OBM Neurobiology*. 2020;4(2):1-20. doi:10.21926/obm.neurobiol.2002059.

Jie B, Liu M, Shen D. Integration of temporal and spatial properties of dynamic connectivity networks for automatic diagnosis of brain disease. *Med Image Anal*. 2018;47:81-94. doi:10.1016/j.media.2018.03.013.

O'Neill GC, Tewarie P, Vidaurre D, Liuzzi L, Woolrich MW, Brookes MJ. Dynamics of large- scale electrophysiological networks: A technical review. *Neuroimage*. 2018;180(Pt B):559-576. doi:10.1016/j.neuroimage.2017.10.003.

Zhang J, Cheng W, Liu Z, et al. Neural, electrophysiological and anatomical basis of brain- network variability and its characteristic changes in mental disorders [published correction appears in Brain. Aug. 1, 2018;141(8):e64]. *Brain*. 2016;139(Pt 8):2307-2321. doi:10.1093/brain/aww143.

Jones DT, Vemuri P, Murphy MC, et al. Non-stationarity in the "resting brain's" modular architecture. *PLoS One*. 2012;7(6):e39731. doi:10.1371/journal.pone.0039731.

Allen EA, Damaraju E, Eichele T, Wu L, Calhoun VD. EEG Signatures of Dynamic Functional Network Connectivity States. *Brain Topogr*. 2018;31(1):101-116. doi: 10. 1007/s10548-017-0546-2.

Chadiha LA, Washington OG, Lichtenberg PA, Green CR, Daniels KL, Jackson JS. Building a registry of research volunteers among older urban African Americans: recruitment processes and outcomes from a community-based partnership. *Gerontologist*. 2011;51 Suppl 1(Suppl 1):S106-S115. doi:10.1093/geront/gnr034.

Kappenman ES, Luck SJ. The effects of electrode impedance on data quality and statistical significance in ERP recordings. *Psychophysiology*. 2010;47(5):888-904. doi:10.1111/j.1469-8986.2010.01009.x.

Pernet C, Garrido MI, Gramfort A, et al. Issues and recommendations from the OHBM COBIDAS MEEG committee for reproducible EEG and MEG research. *Nat Neurosci*. 2020;23(12):1473-1483. doi:10.1038/s41593-020-00709-0.

Poar R, Giordani B, Kavcic V. Effective differentiation of mild cognitive impairment by functional brain graph analysis and computerized testing. *PLoS One*. 2020;15(3):e0230099. Published Mar. 16, 2020. doi:10.1371/journal.pone.0230099.

Kayser J, Tenke CE. On the benefits of using surface Laplacian (current source density) methodology in electrophysiology. *Int J Psychophysiol*. 2015;97(3):171-173. doi:10.1016/j.ijpsycho.2015.06.001.

Kamarajan C, Pandey AK, Chorlian DB, Porjesz B. The use of current source density as electrophysiological correlates in neuropsychiatric disorders: A review of human studies. *Int J Psychophysiol*. 2015;97(3):310-322. doi:10.1016/j.ijpsycho.2014.10.013.

Kayser J, Tenke CE. Issues and considerations for using the scalp surface Laplacian in EEG/ERP research: A tutorial review. *Int J Psychophysiol*. 2015;97(3):189-209. doi:10.1016/j.ijpsycho.2015.04.012.

Kayser J. Current source density (CSD) interpolation using spherical splines—CSD Toolbox—current source density (CSD) and surface potential (SP) interpolation using spherical splines. Accessed May 17, 2023. http://psychophysiology.cpmc.columbia.edu/Software/CSDtoolbox.

Meyer Y, Salinger DH. *Wavelets and Operators*. Cambridge University Press; 2004.

The MathWorks I. Wavelet toolbox. Wavelet Toolbox Documentation. Accessed May 17, 2023. https://www.mathworks.com/help/wavelet/.

Wang Z, Zheng Y, Zhu DC, Bozoki AC, Li T. Classification of Alzheimer's Disease, Mild Cognitive Impairment and Normal Control Subjects Using Resting-State fMRI Based Network Connectivity Analysis. *IEEE J Transl Eng Health Med*. 2018;6:1801009. Published Oct. 15, 2018. doi:10.1109/JTEHM.2018.2874887.

Jung Y, Hu J. A *K*-fold Averaging Cross-validation Procedure. *J Nonparametr Stat*. 2015;27(2):167-179. doi:10.1080/10485252.2015.1010532.

Spetsieris PG, Dhawan V, Eidelberg D. Three-fold cross-validation of parkinsonian brain patterns. *Annu Int Conf IEEE Eng Med Biol Soc*. 2010;2010:2906-2909. doi: 10.1109/IEMBS.2010.5626327.

Fassina L, Faragli A, Lo Muzio FP, et al. A Random Shuffle Method to Expand a Narrow Dataset and Overcome the Associated Challenges in a Clinical Study: A Heart Failure Cohort Example. *Front Cardiovasc Med*. 2020;7:599923. Published Nov. 20, 2020. doi:10.3389/fcvm.2020.599923.

Svob Strac D, Konjevod M, Sagud M, et al. Personalizing the Care and Treatment of Alzheimer's Disease: An Overview. *Pharmgenomics Pers Med*. 2021;14:631-653. Published May 28, 2021. doi:10.2147/PGPM.S284615.

\* cited by examiner

Discrimination of HC and MCI Based on Rating-State EEG (137 Subjects: 84 HC and 53 MCI, Randomly Shuffled 10 Times for 3-Fold, 5-Fold and 10-Fold Cross-Validation)

(a) Leave-One-Out

| Actual Class | Predicted Class HC | Predicted Class MCI | Recall (or Sensitivity) |
|---|---|---|---|
| HC | 80 | 4 | 95.24% |
| MCI | 7 | 46 | 86.79% |
| Precision | 91.95% | 92.00% | ACC=91.97% |

(b) 10-Fold

| Actual Class | Predicted Class HC | Predicted Class MCI | Recall (or Sensitivity) |
|---|---|---|---|
| HC | 796 | 44 | 94.76% |
| MCI | 58 | 472 | 89.10% |
| Precision | 93.21% | 86.61% | ACC=92.55% |

(c) 5-Fold

| Actual Class | Predicted Class HC | Predicted Class MCI | Recall (or Sensitivity) |
|---|---|---|---|
| HC | 798 | 42 | 95.00% |
| MCI | 69 | 461 | 86.98% |
| Precision | 92.04% | 86.61% | ACC=91.90% |

(d) 3-Fold

| Actual Class | Predicted Class HC | Predicted Class MCI | Recall (or Sensitivity) |
|---|---|---|---|
| HC | 785 | 55 | 93.45% |
| MCI | 66 | 464 | 87.55% |
| Precision | 91.95% | 92.00% | ACC=91.17% |

(e) Leave-One-Out: Male vs. Female

| LOO Result | # of Subjects | # of Subjects Correctly Classified | # of Subjects Correctly Classified |
|---|---|---|---|
| Female | 123 | 113 (91.87%): HC-73, MCI-40 | 10 (8.13%): HC-3, MCI-0 |
| Male | 14 | 13 (92.86%): HC-7, MCI-6 | 1 (7.14%): HC-1, MCI-0 |

▫ ACC Stands for the Overall Discrimination Accuracy

FIG. 7

MILD COGNITIVE IMPAIRMENT DETECTION AND PREDICTION SYSTEM

STATEMENT OF GOVERNMENT SUPPORT

This disclosure was made with government support under Grant No. 2032709 awarded by the National Science Foundation and Grant Nos. R21-AG046637, R01-AG054484, P30AG053760 and P30AG072931 awarded by the National Institutes of Health. The government has certain rights in this invention.

FIELD

The present disclosure relates to methods and systems of detecting and predicting mild cognitive impairment (MCI), especially methods and systems of detecting and predicting mild cognitive impairment using resting-state electroencephalogram (EEG).

BACKGROUND

Developing economically viable assessment tools and biomarkers that are highly sensitive to cognitive decline and neural dysfunction, before frank Alzheimer's disease (AD) pathology, is critical for the study of neurodegenerative mechanisms and interventions to promote cognitive resiliency, especially for under-served populations who may face challenges in acquiring proper health care. Studies have shown that community-dwelling older African Americans show faster rates of cognitive decline than older white Americans and are almost twice as likely to develop mild cognitive impairment (MCI) and Alzheimer's disease.

Early discrimination and prediction of mild cognitive impairment (MCI) are crucial for the study of neurodegenerative mechanisms and interventions to promote cognitive resiliency. Existing work mainly focuses on the detection of MCI before Alzheimer's onset; however, quantitative methods which enable prediction of progression trends in older adults, especially pre-MCI diagnosis, are far less frequent.

SUMMARY

The present system allows early detection and prediction of people at risk of mild cognitive impairment before clinical symptoms may occur.

The present disclosure focuses on resting-state EEG data collected among high-risk seniors. A multi-scale analysis of brain functional connectivity was used to obtain a series of discrimination approaches for healthy control (HC) and MCI. Thereafter, a combined diversified approach to quantify the state of cognitive health was developed. The novel EEG-based discrimination model demonstrates high sensitivity and stability for MCI detection. In addition, each decision on HC or MCI may also have an EEG-based cognitive status score, which is used to predict the personal progression trend of cognitive health in older adults, especially African American seniors.

The present disclosure generally uses resting-state EEG (eye-closed, 64-channel). A multiscale analysis on time-varying brain functional connectivity was conducted to develop an innovative soft discrimination model for HC and MCI. Both a multiscale analysis of the dynamic functional connectivity of the brain and soft detection and prediction of MCI based on machine learning algorithms and majority voting is set forth.

In one aspect of the disclosure, a method and system for assessing brain impairment includes generating electroencephalogram (EEG) signals from a plurality of electrodes, removing artifacts from the EEG signals to generate artifact reduced signals, generating current source density signals from the artifact reduced signals, performing multiscale analysis of dynamic functional connectivity of a brain based on the current source density signals using a plurality of different sized time windows, generating hard classifiers for each of the plurality of different size time windows, selecting classifiers from the hard classifiers to form selected classifiers, performing majority voting on a discrimination of normal cognition and mild cognitive impairment using the selected classifiers, generating an EEG-based health score of overall brain activity based on majority voting of the selected classifiers and generating a display corresponding to the health score of brain activity.

In another aspect of the disclosure, a method of assessing brain impairment of regions of interest of a brain includes generating, using a current source density, correlation vectors corresponding to functional connectivity between the regions of interest of the brain for a plurality of different window sizes, determining wavelet coefficients for the correlation vectors corresponding to time and frequency, determining a set of primitive features for each of a plurality of window sizes corresponding to the wavelet coefficients, selecting classifiers using linear discriminant analysis to form selected classifiers, determining hard decision classifications from the selected classifiers, performing majority voting using the hard decision classifications of the selected classifiers to form a soft score indicative of cognitive impairment and generating a display displaying the soft score.

In yet another aspect of the disclosure, a system for assessing brain impairment includes a multi-scale brain functional connectivity analyzer that performs multiscale analysis of dynamic functional connectivity of a brain based on EEG signals using a plurality of different sized time windows. A discriminator generates hard classifiers for each of the time windows, selects classifiers from the hard classifiers to form selected classifiers, performs majority voting of the using the selected classifiers and generates a level of cognitive impairment based on majority voting of the selected classifiers. A display is coupled to the discriminator for generating a screen display corresponding to a level of cognitive impairment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3:
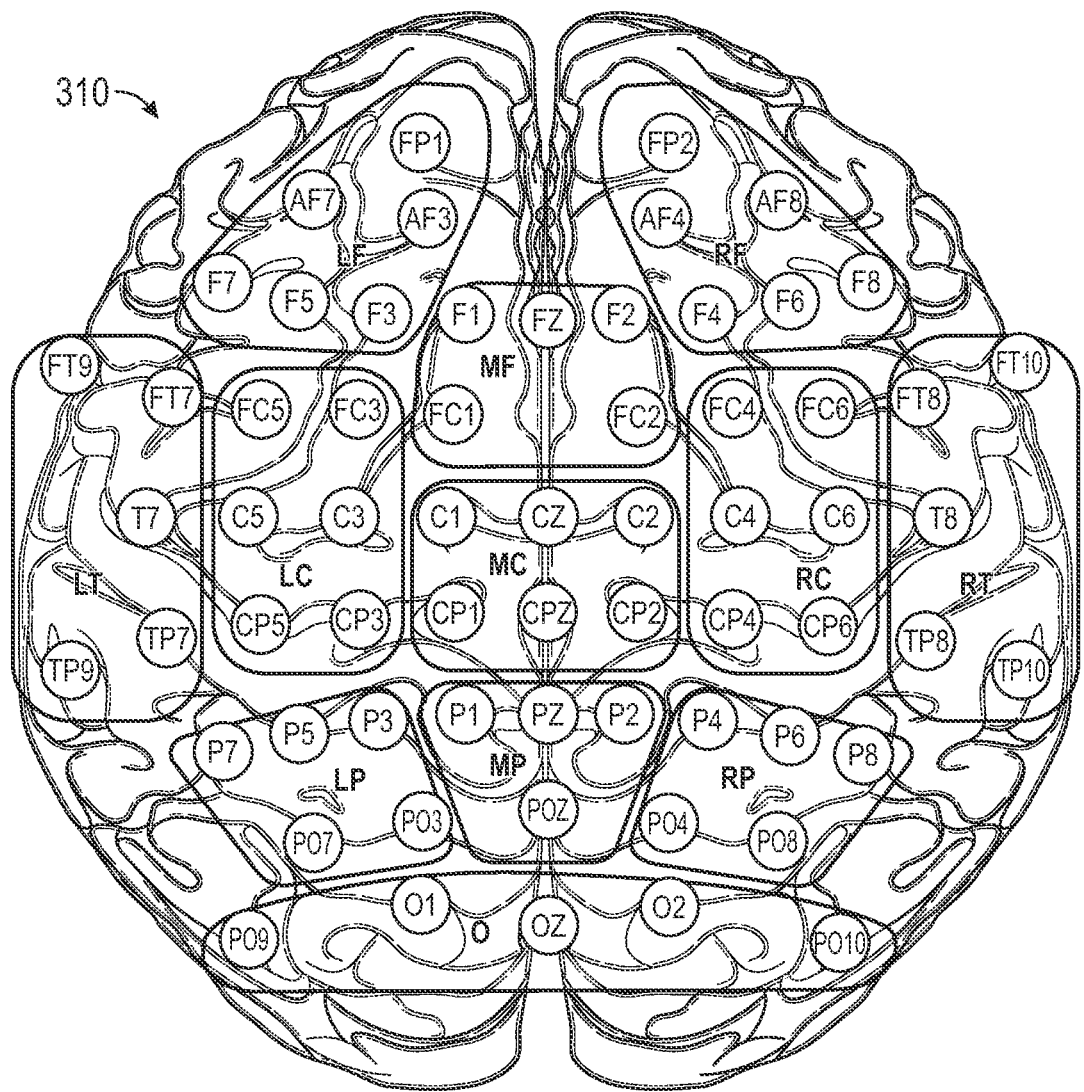

FIG. 3 provides an illustration of a brain having one or more regions of interest (ROI), according to the present disclosure.

Figure 4:
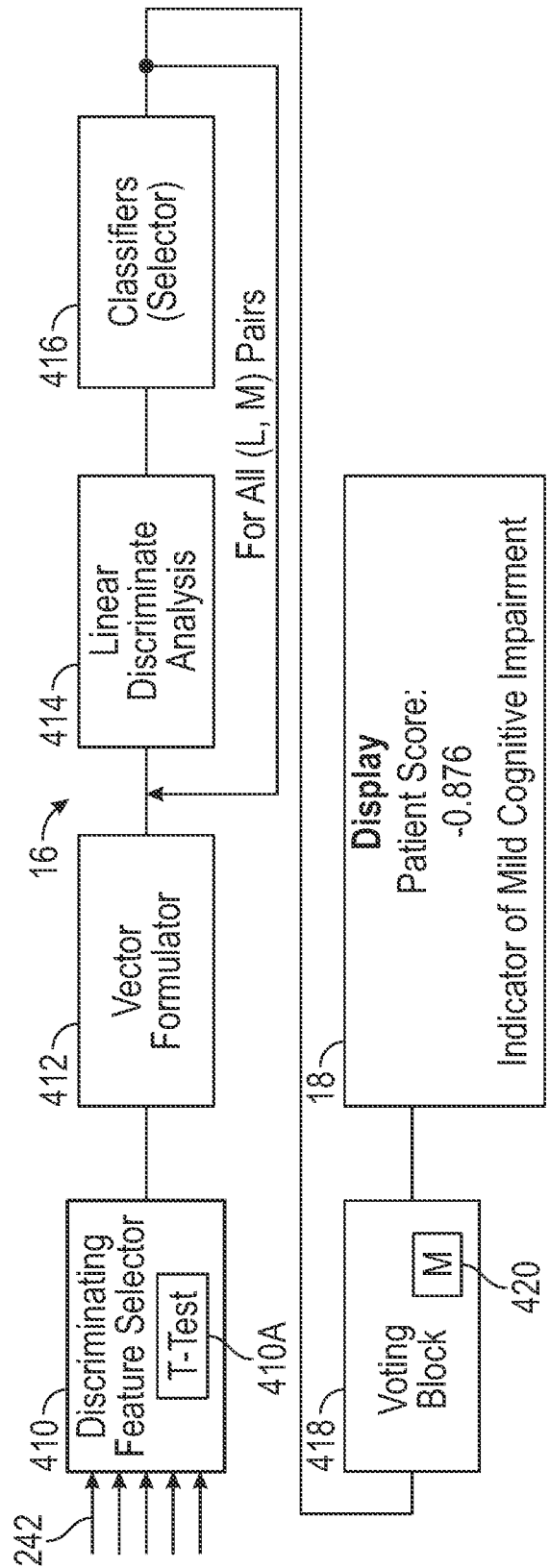

FIG. 4 is a block diagram of the pre-processing analyzer.

Figure 5:
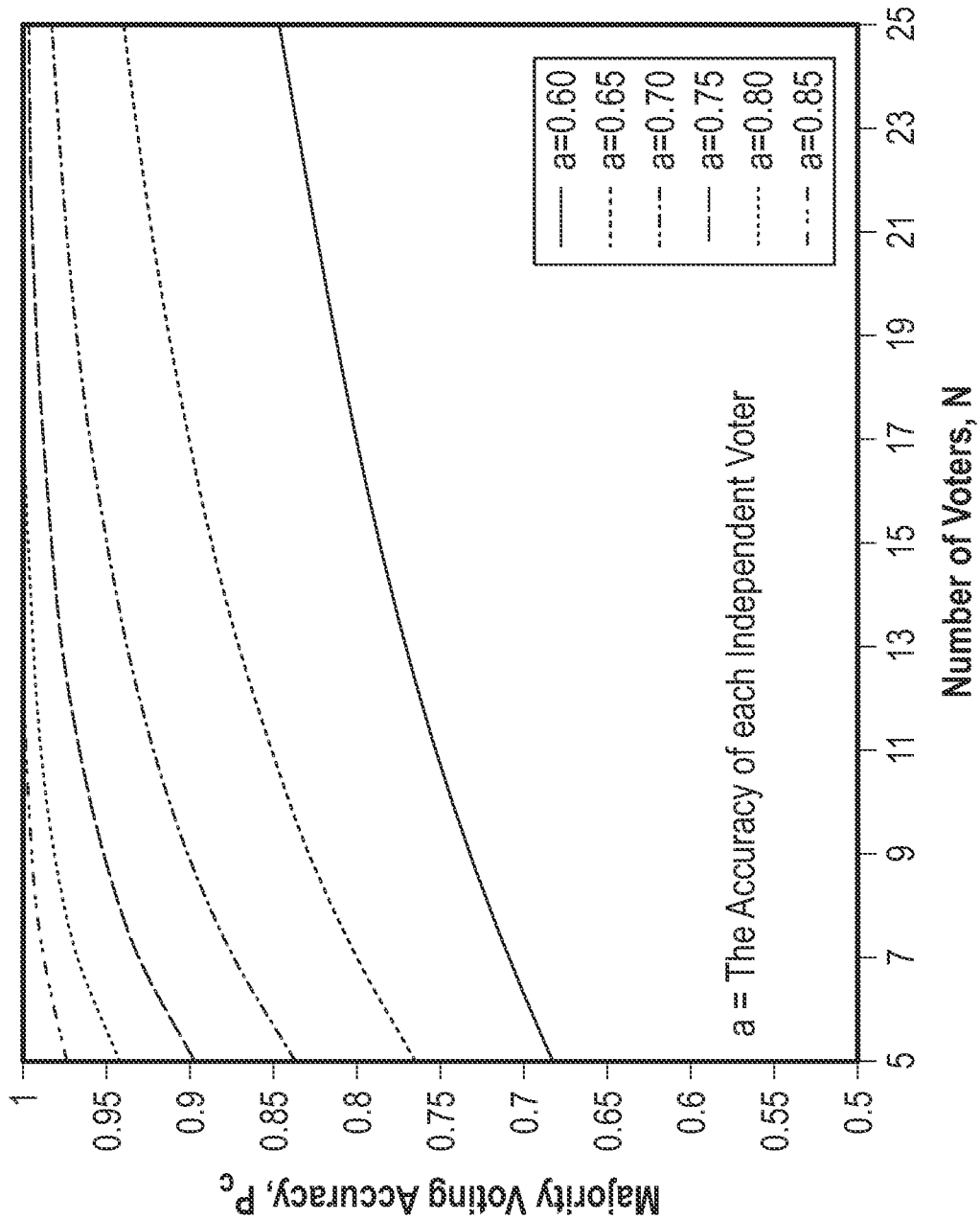

FIG. 5 is a graph illustrating a majority voting accuracy verse a number of independent voters, according to the present disclosure.

Figure 6A:
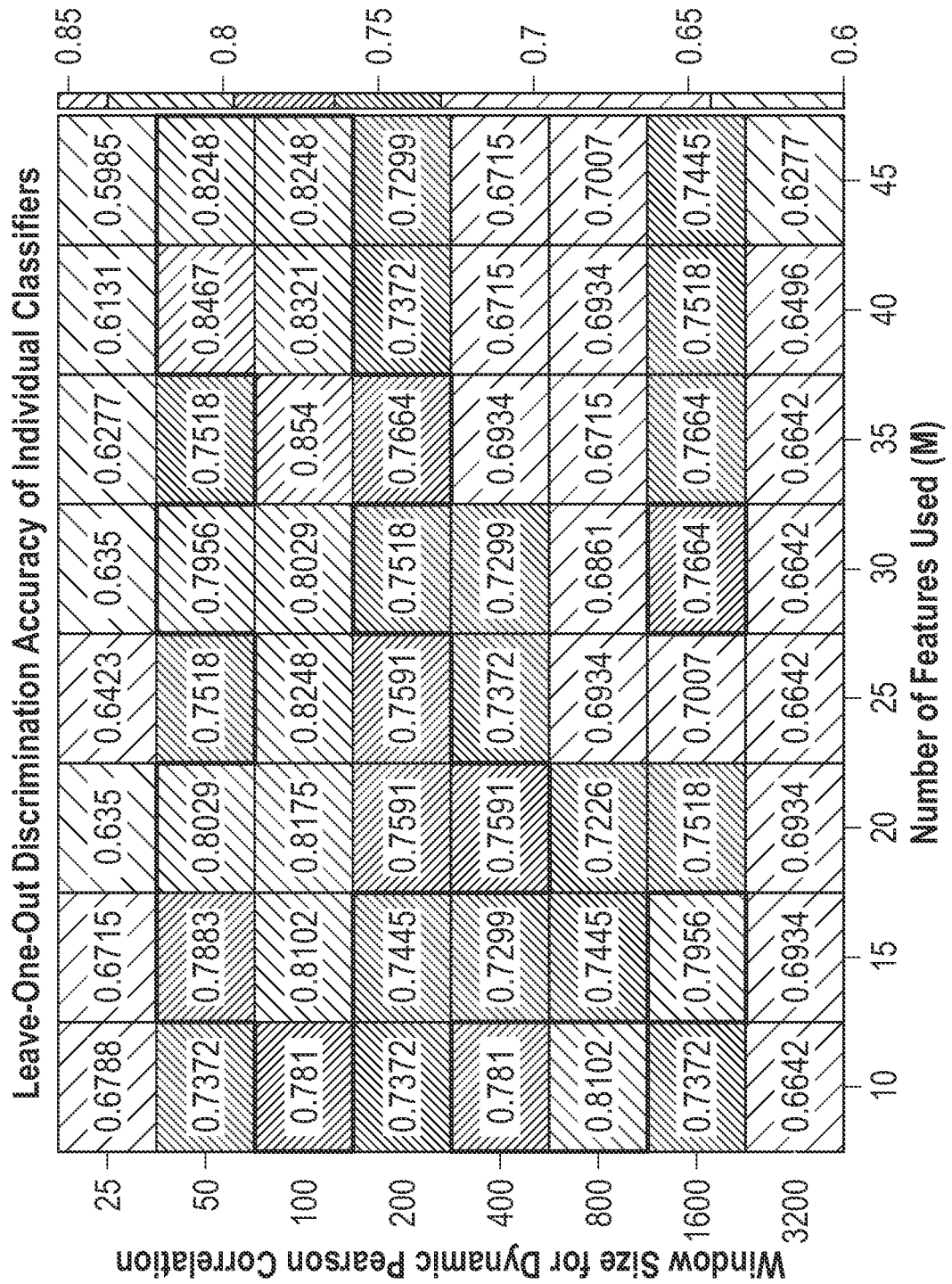

FIG. 6A is a graph illustrating discrimination results of individual classifiers for a leave-one-out cross-validation, according to the present disclosure.

Figure 6B:
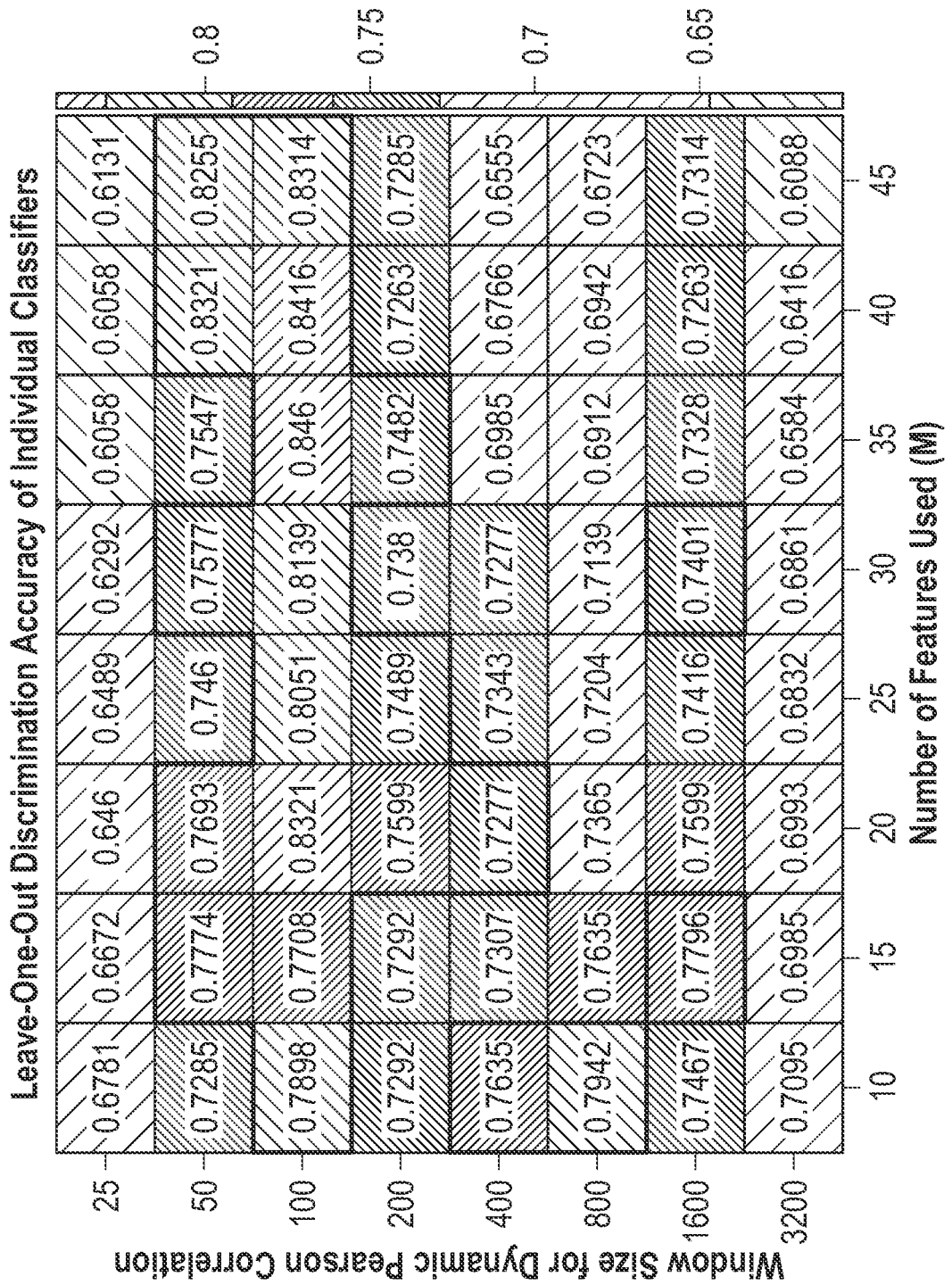

FIG. 6B is a graph illustrating discrimination results of individual classifiers for a 10-fold cross-validation, according to the present disclosure.

Figure 6C:
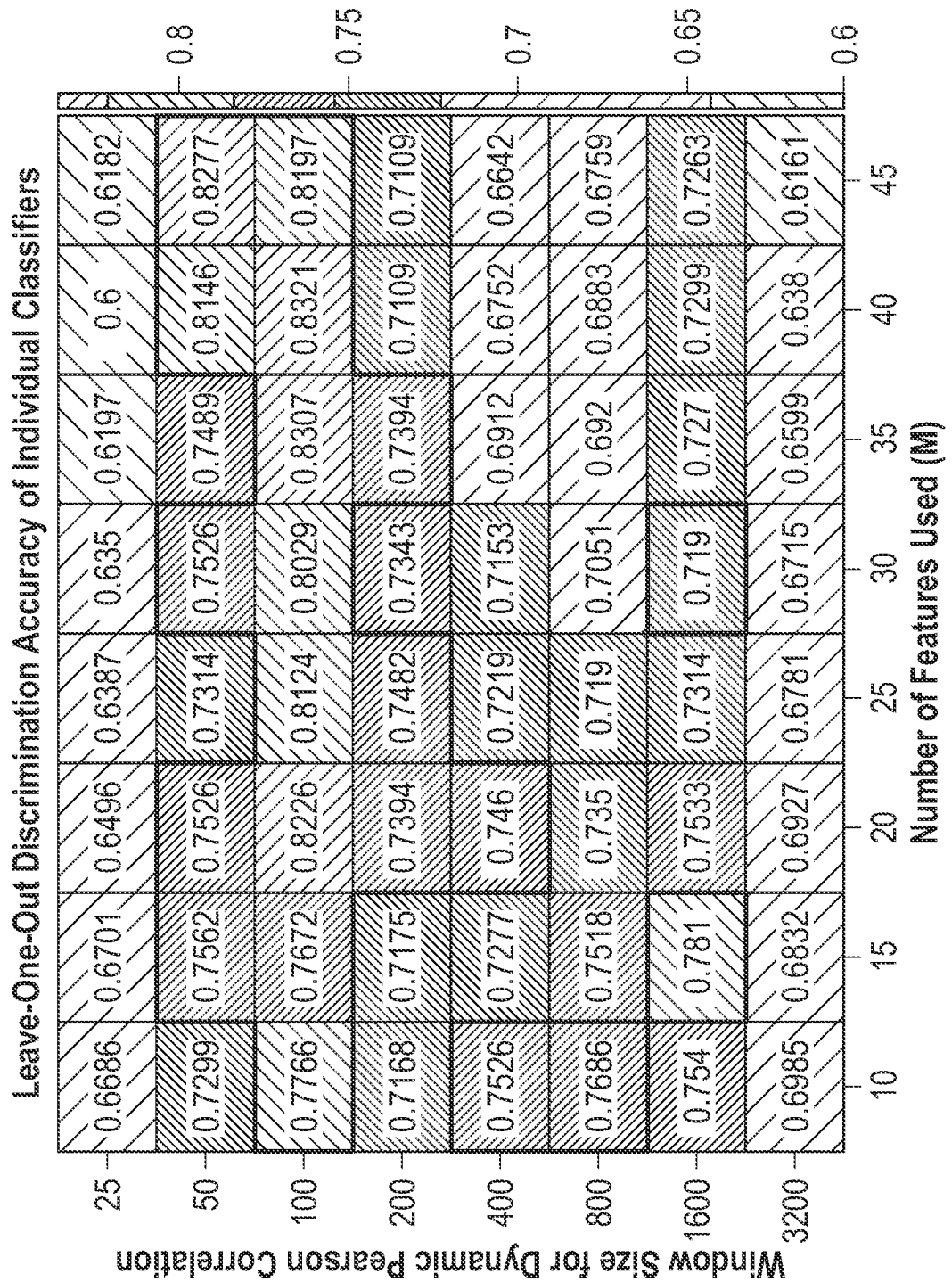

FIG. 6C is a graph illustrating discrimination results of individual classifiers for a 5-fold cross-validation, according to the present disclosure.

Figure 6D:
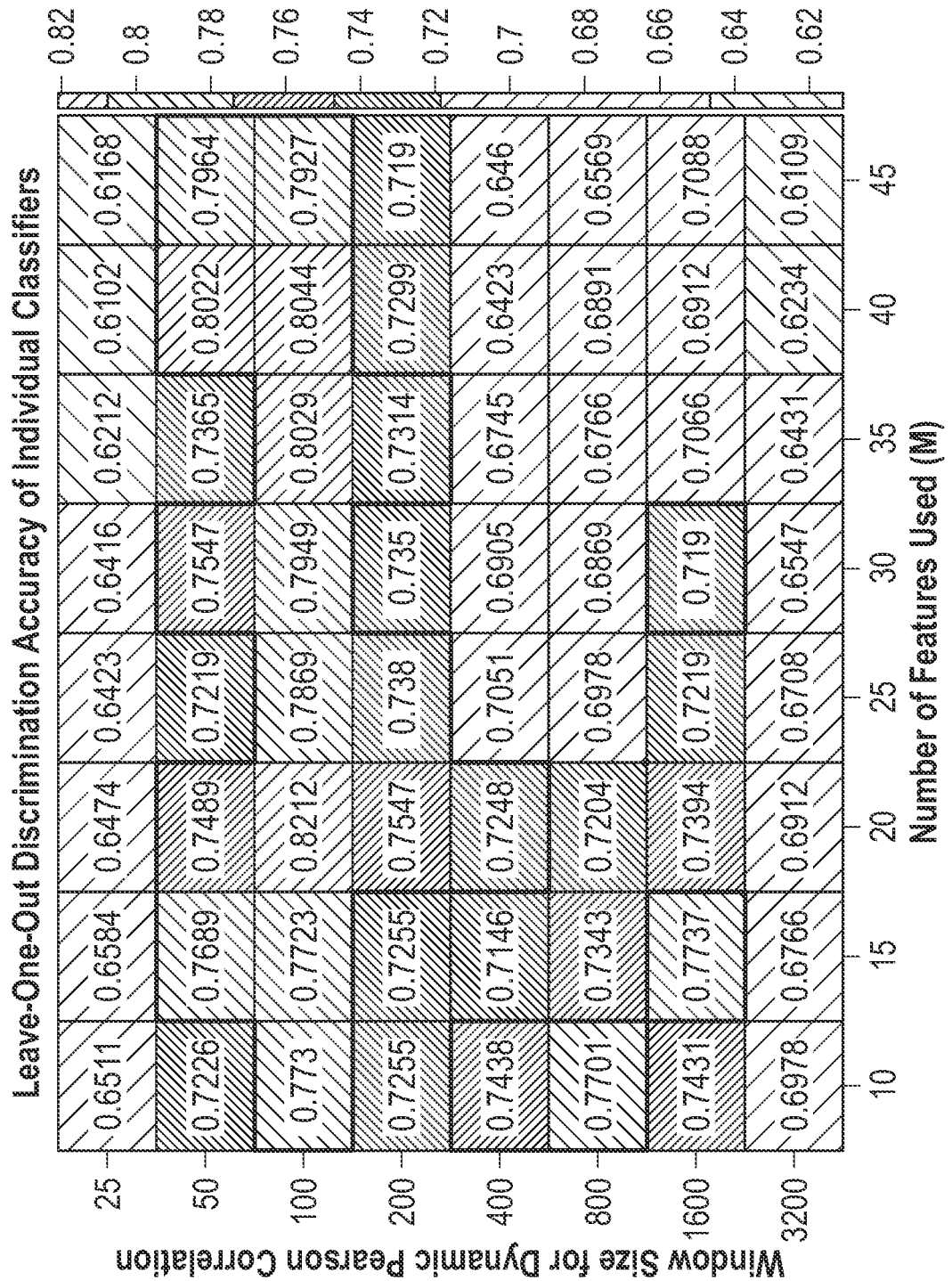

FIG. 6D is a graph illustrating discrimination results of individual classifiers for a 3-fold cross-validation, according to the present disclosure.

FIG. 7 is a plurality of charts illustrating majority voting results, according to the present disclosure.

Figure 8A:
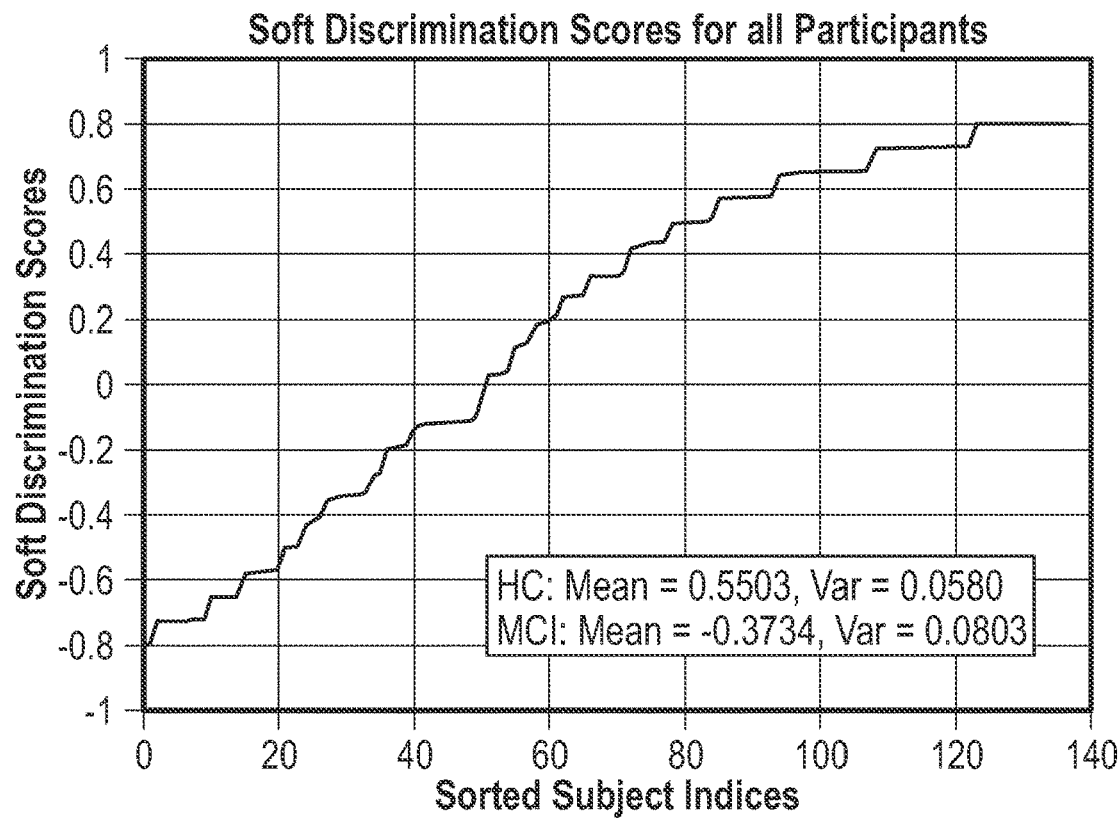
Figure 8B:
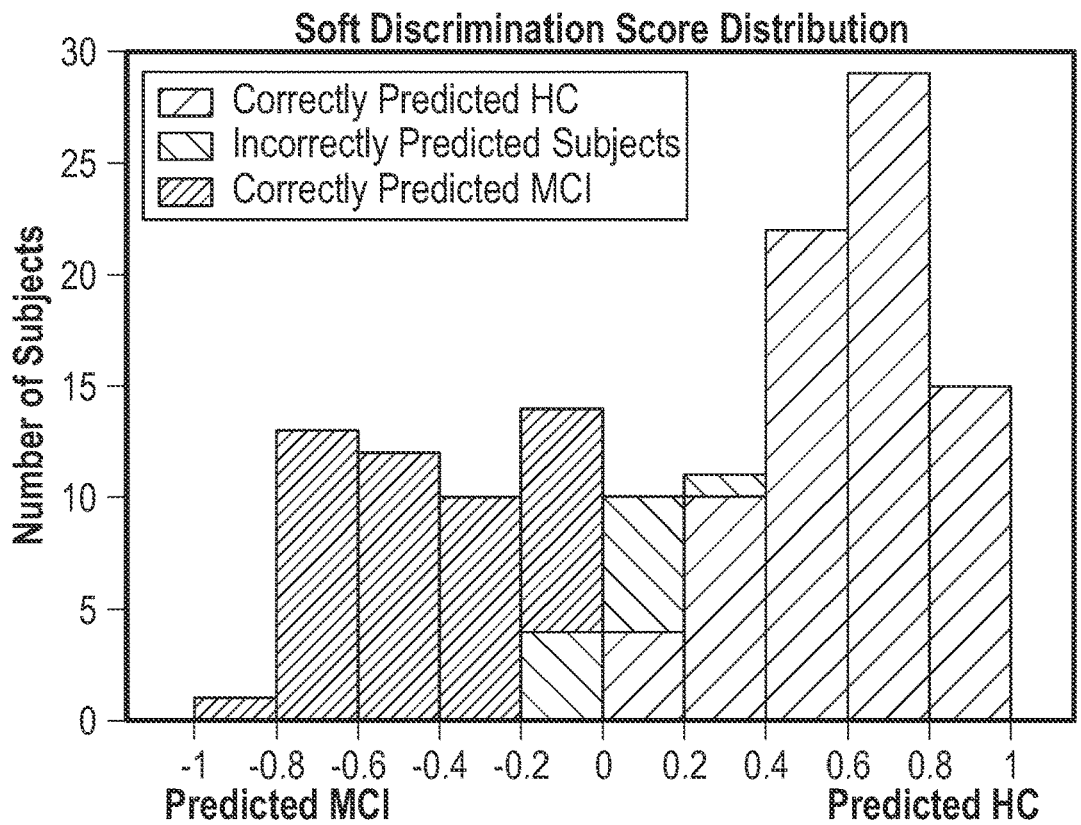

FIGS. 8A and 8B are graphs illustrating soft discrimination of health control (HC) and mild cognitive impairment (MCI) based on leave-one-out cross validation, according to the present disclosure.

Figure 9A:
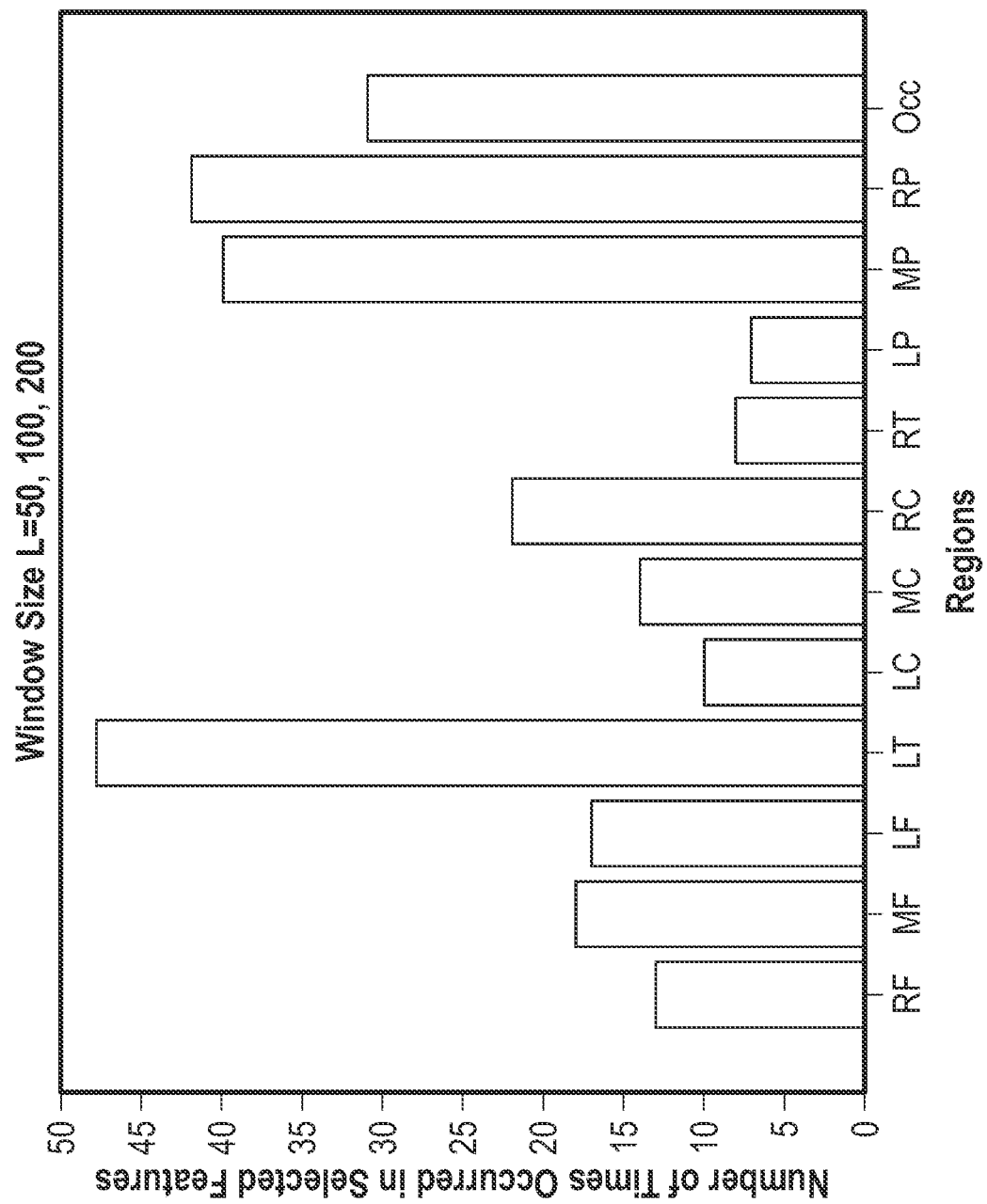

FIG. 9A is a bar chart illustrating the frequency of occurrence of all the ROI regions in the 45 selected features with a window size L=50, 100, 200, according to the present disclosure.

Figure 9B:
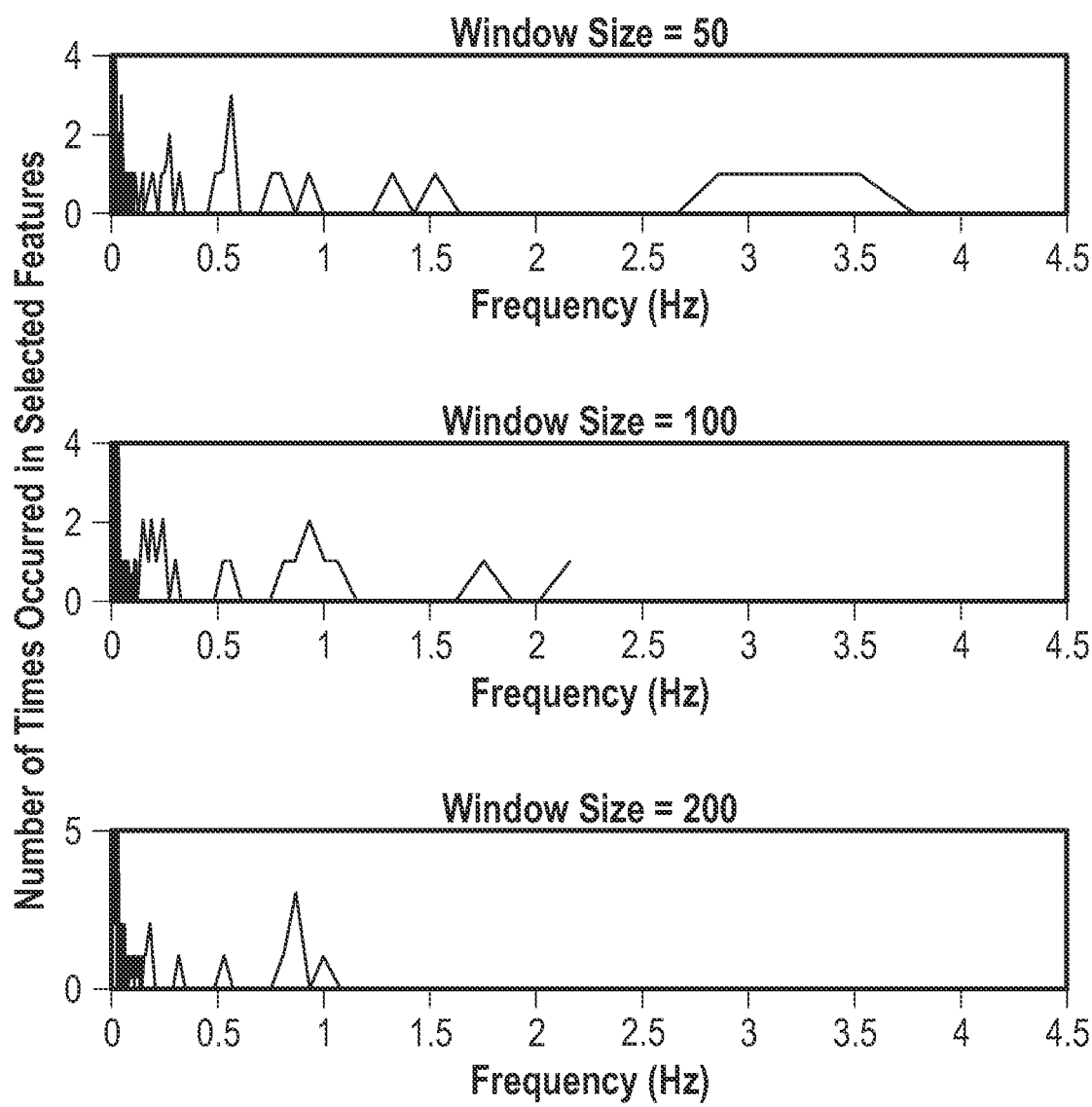

FIG. 9B is a line chart illustrating the frequency that each ROI region occurs in the selected features with the window size L=50, 100, 200, according to the present disclosure.

Figure 9C:
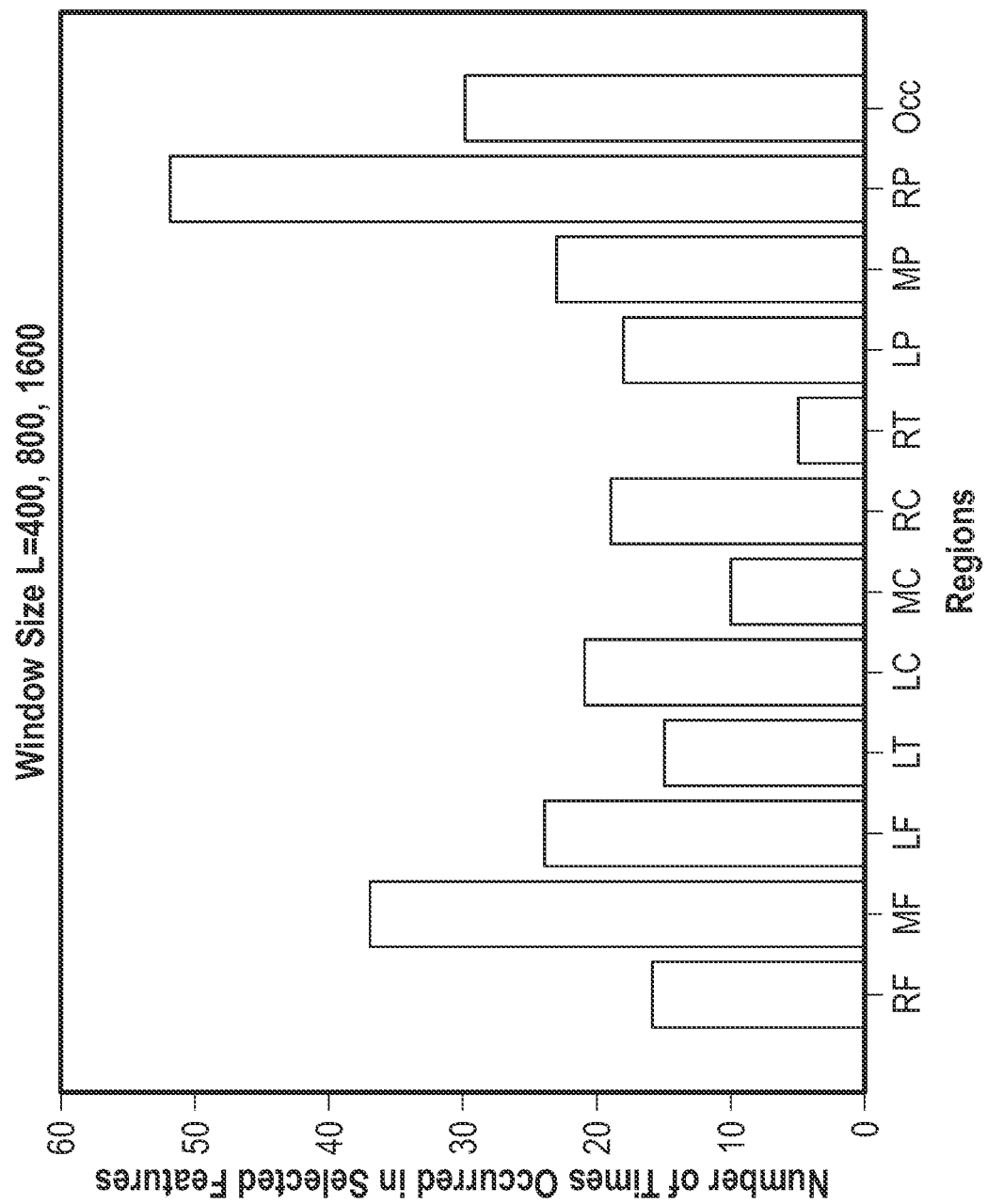

FIG. 9C is a bar chart illustrating frequency of occurrence of all the ROI regions in the 45 selected features with a window size L=400, 800, 1600.

Figure 9D:
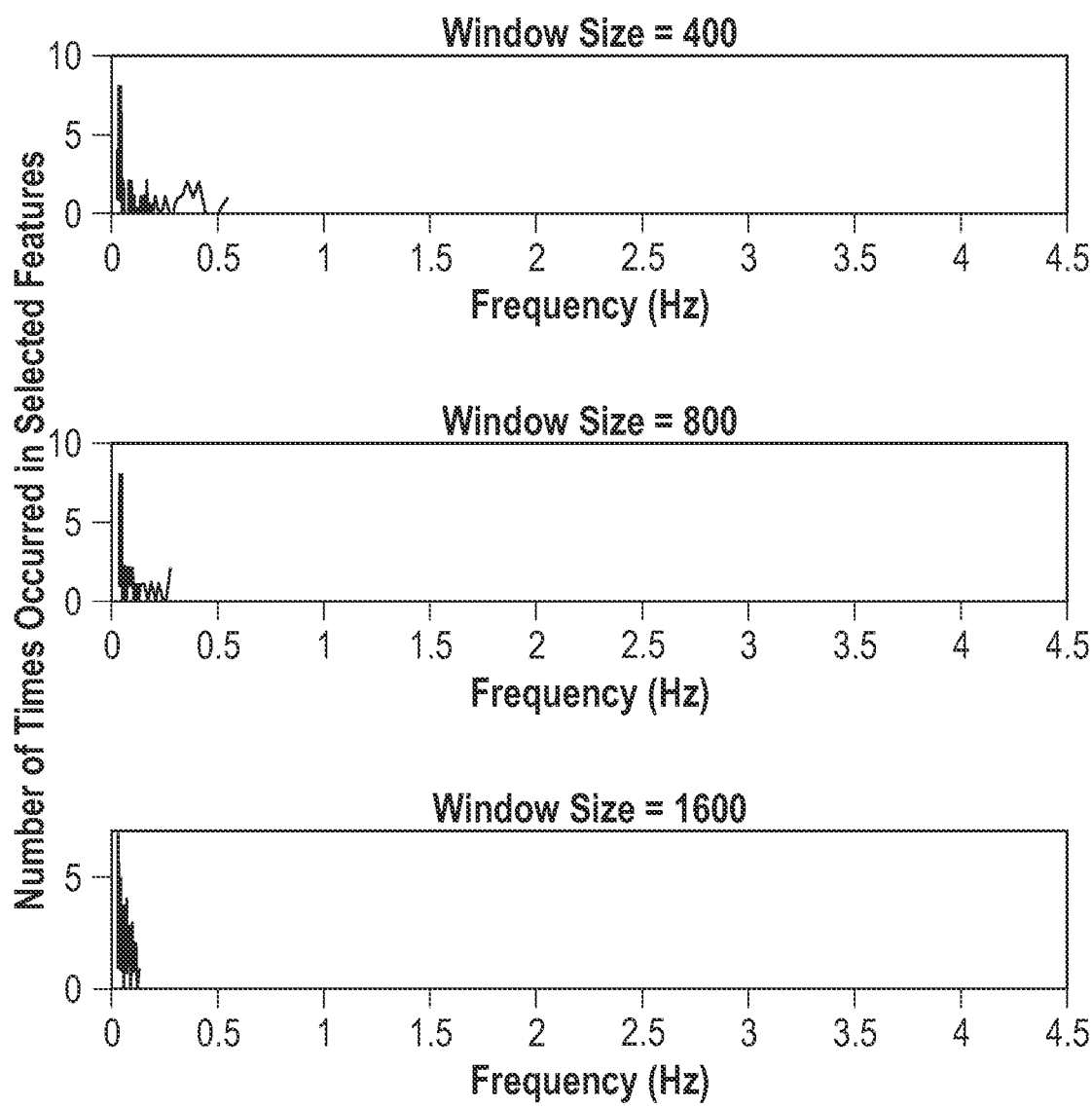

FIG. 9D is a line chart illustrating the frequency of occurrence of all the ROI regions in the 45 selected features with the window size L=400, 800, 1600.

Corresponding reference numerals indicate corresponding parts throughout the several views of the drawings.

DETAILED DESCRIPTION

Example embodiments will now be described more fully with reference to the accompanying drawings.

This disclosure focuses on EEG data collected among high-risk older African Americans and aims to develop a reliable and sensitive assessment tool for early recognition of people at risk for MCI and dementia, especially among African American seniors.

Due to its high time resolution, accessibility, affordability, and patient acceptance, EEG-based detection of AD and MCI has attracted increased research attention recently. The results in the existing work, however, are mixed and call for newer analytic methods. It was found that a very high accuracy (>96%) may be achieved over modest sample sizes (22-34 subjects).

Note that compared with task-based EEG, resting-state EEG, which requires no training or active responses of the participants and therefore more desirable for clinical operability. In this disclosure, a reliable and sensitive assessment tool for early detection of persons at risk for MCI based solely on resting-state EEG is set forth. A soft discrimination model for HC and MCI has been developed that not only can produce a binary decision (also known as a hard decision) on HC or MCI for each tested participant, but also can provide a soft score which characterizes the cognitive status of the participant.

The first step is to conduct multiscale analysis on dynamic brain functional connectivity. Existing research suggests that the abnormal brain functions in AD and MCI are closely related to the weakening or loss of connectivity among critical brain regions. In the literature, functional connectivity between two brain regions is often taken as a static parameter and is represented as a constant, such as the Pearson correlation of two time series. More recently, however, it has been observed that in fact, functional connectivity varies significantly with time, and the dynamic variation of functional connectivity may indicate changes in neural activity patterns in cognitive and behavioral aspects.

In this disclosure, instead of using a fixed observation window size as in traditional evaluation tools for time-varying functional connectivity, a whole set of different window sizes were chosen and therefore the dynamics of the functional connectivity at different frequency resolutions were captured and is referred to below as "multiscale analysis". The feature vectors for each subject accordingly feed the selected features into a machine-learning algorithm for the discrimination of HC and MCI. By tuning the observing window size and the group of features used, a series of approaches is used each representing a different configuration of the discrimination model and has its own accuracy.

The present method introduces new biomarkers which reflect how the functional connectivity is changing in both the time and frequency domains across the EEG-based ROIs in HC and MCI. Analysis indicates that these biomarkers are closely related to the resting state EEG biomarkers for AD as identified in consistent findings.

Second, unlike existing work which generally relies only on one detection approach, the soft discrimination of HC and MCI herein is obtained through weighted majority voting of a selected group of reliable discrimination approaches. This combination of diversified approaches takes the discrepancies between HC and MCI from different perspectives into consideration, and improves the accuracy, stability, and reliability of the present model. Moreover, in addition to a binary HC or MCI decision, the result also comes with an EEG-based cognitive status score, which shows promising capability in predicting the personal progression trend of cognitive health in older adults, and hence makes it possible for the early detection of people at risk of cognitive decline even before the MCI symptoms may first appear.

137 community-dwelling African American participants (122 females, 15 males) were recruited, ranging in age from 60 to 90 years, from the greater Detroit area. Some of the participants were recruited at the Healthier Black Elders Center, a collaboration between Wayne State University's Institute of Gerontology and University of Michigan's Institute of Social Research, and others were recruited through the Michigan Alzheimer's Disease Research Center (MADRC) from outreach programs in local churches and community centers. To evaluate a group of community-dwelling participants with a high risk of cognitive decline, persons were recruited if they considered themselves to be fully functioning, though they also responded positively to a question asking if they were concerned that they may have experienced a potential decline in cognitive ability over the past year. All participants were diagnosed through the MADRC consensus conference utilizing the National Alzheimer's Coordinating Center (NACC) Unified Data Set (UDS)-84 of them being HC and 53 with MCI (42 amnestic MCI and 11 non-amnestic MCI). Because of the small number of non-amnestic MCI participants, all MCI were combined into one group. All participants were consented and signed a written consent document. All procedures were in accordance with the principles expressed in the Declaration of Helsinki and approved by the Wayne State University Research Subjects Review Board and the University of Michigan Medical School Institutional Review Board.

There were no significant differences among HC, healthy control subjects; aMCI, amnestic mild cognitive impairment subjects; naMCI, non-amnestic mild cognitive impairment subjects in terms of education, and as expected, the average age of the MCI group was slightly higher than that of the HC group.

Figure 1:
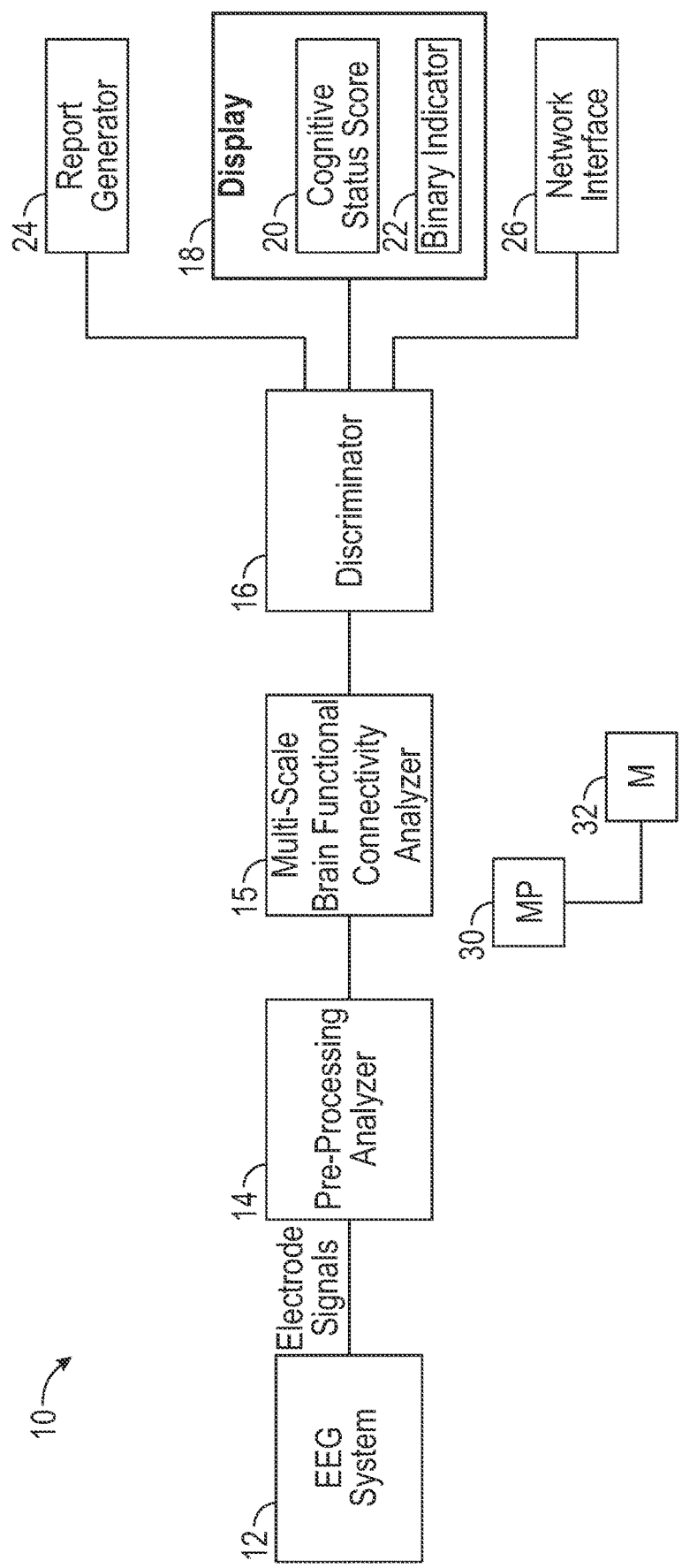
FIG. 1 is a block diagram of a block diagram of the MCI detection and prediction system.

Referring now to FIG. 1, a mild cognitive impairment (MCI) and prediction system 10 is set forth. The system includes an EEG system 12 that generates electrode signals. In this example 64 electrodes were used. A preprocessing analyzer 14 receives the electrode signals and pre-processes the signals into a plurality of primitive features that correspond to different windows of data, sliding windows. A multi-scale brain functional connectivity analyzer 15 generates a plurality of primitive features for a plurality of time windows. The discriminator 16 receives the data of the primitive features and determines an indicator with a voting process as described in greater detail below. The display 18 displays a cognitive status score 20 or soft score on a screen display. In the present example, the score ranges between +1 and −1 where the positive values are more indicative of healthy (HC) and negative values more indicative of MCI. The data is soft meaning the cognitive status score 20 provides a sliding scale value rather than the binary score 22 (yes or no) displayed on the display 18. A report generator 24 may print or generate a physical copy of the report having the cognitive status score therein. The report may be generated over time so trends can be observed. Likewise, a network interface by be used to communicate the cognitive status score to other computing devices 26. The system 10 may be implemented by one or more processors 30 that perform various functions. A memory 32 is a non-transitory computer readable medium that has machine readable instructions that are executable by the processor 30 to perform the various functions.

Figure 2:
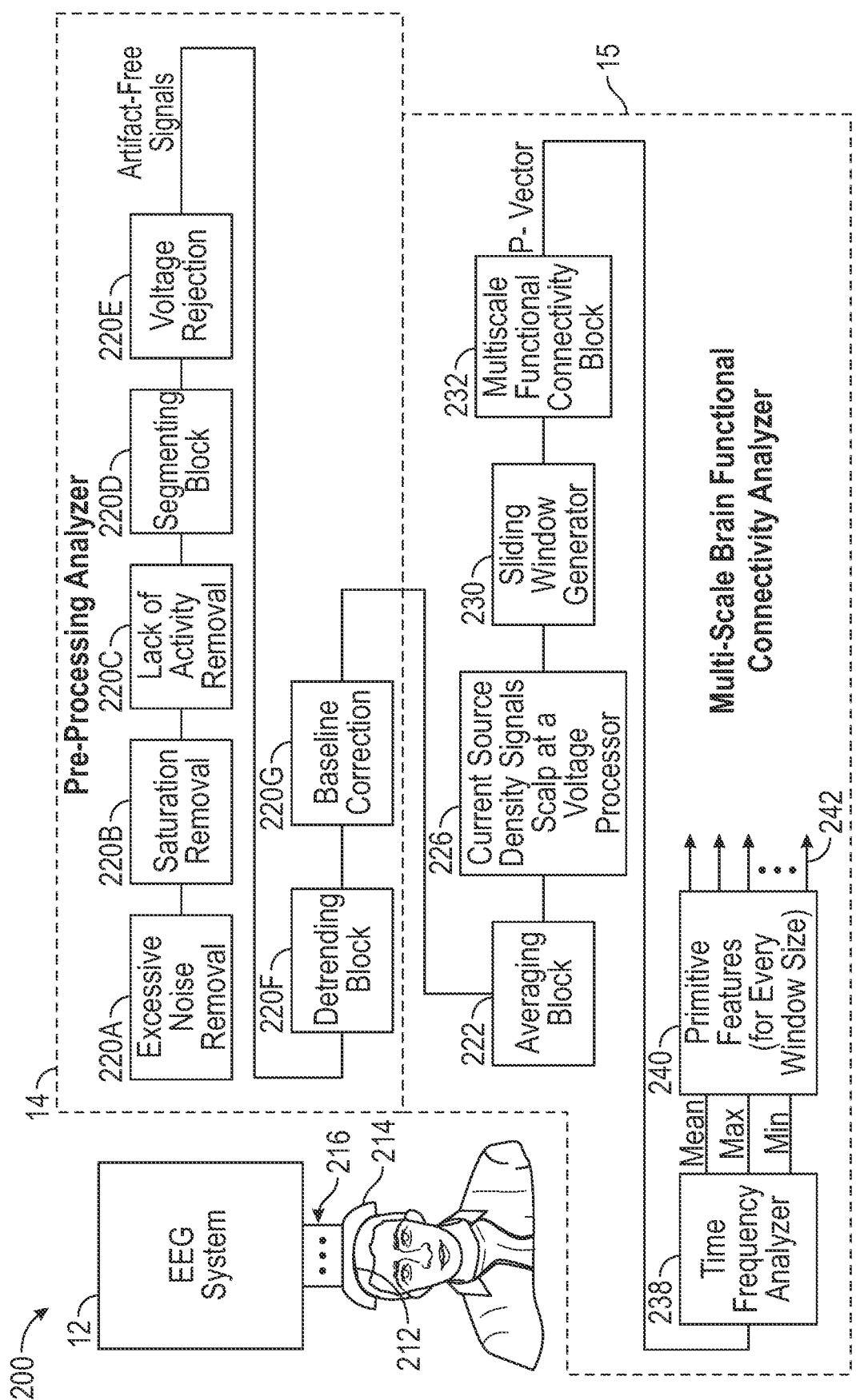
FIG. 2 is a detailed block diagram of the primitive feature generation system of FIG. 1.

Referring now to FIG. 2, a primitive feature generation system 200 is set forth for generating primitive features to be used in the discriminator 16. The primitive feature generation system 200 includes the pre-processing analyzer 14 and the multi-scale brain functional connectivity analyzer 15. The EEG system 12 such as a Brain Vision, Inc. EEG device is used to record EEG activity from a scalp 212 with a high-density cap 214 (64 active electrodes 216) such as an ActiCap, modified according to the International 10-20 System. The recording locations included the FCz electrode as an online reference and the AFz electrode at midline location as a ground. After proper placing of the electrode cap 214 with 64 electrodes 216 and obtaining satisfactory impedances, the participant was seated behind the desk in a comfortable chair, adjusted for height, in a dimly lit room. As part of a larger study on brain activity event-related potential (ERP), each participant received a three-minute, eye-closed resting-state EEG recording. Eye-closed resting-state EEG is adopted in this disclosure for higher scalability, reproducibility, and clinical operability, as well as minimizing external influence.

The EEG recordings were performed in a community center at the University of Michigan (UM) Detroit Center or the Institute of Gerontology at Wayne State University using the same EEG system. Available spaces were evaluated with a Gauss meter prior to EEG recording to find the area with the least external noise (preferably <0.3 mG) to obtain an acceptable EEG signal. Active electrodes were also used to additionally isolate external noise, minimize cable movement artifacts, and keep impedances below 10 kΩ.

An analyzer 220 (Brain Vision, Inc.) was used for pre-processing of the baseline EEG data. Off-line was used for inspection to identify and remove segments of EEG contaminating either excessive noise at the excessive noise removal block 220A, saturation at the saturation removal block 220B, or lack of EEG activity at the lack of activity block 220C. A segmenting block 220D segments the cleaned EEG data in consecutive epochs of 2 seconds which was analyzed off-line (1024 data points; 0.488 Hz resolution; Hanning window). A voltage rejection block 220E using a rejection criterion of +/−100 mV on any channel affected by artifacts (muscular, instrumental) was used to identify acceptable epochs and reject epochs outside of that range. The artifact-reduced segment signals were additionally detrended in a detrending block 220F and baseline corrected in a baseline correction block 220G.

After the preprocessing procedure, the multi-scale brain functional connectivity analyzer performs various functions. An averaging block 222 averages the signals from each of the electrodes in each of the regions of the brain to reduce noise. For example, all the right frontal electrode signals are averaged into one signal. One average signal is generated for each region of interest of the brain. The shortest length of the eye-closed, resting-state EEG among all the 137 participants is 110s. Therefore, for each subject, the first 110 seconds of data when the eyes are closed in a resting-state of the EEG signals of all the 64 channels are used for further analysis.

Referring now also to FIG. 3, a brain 310 illustrating a total of twelve regions of interest (ROI) is illustrated: Right frontal—RF (Fp1, AF7, AF3, F7, F5, F3), Medium frontal—MF (F1, Fz, F2, FC1, FC2), Left frontal—LF (F4, Fp2, AF4, AF8, F6, F8), Left temporal—LT (FT9, FT7, T7, TP7, TP9), Left central—LC (FC5, FC3, C5, C3, CP5, CP3), Medial central—MC (C1, Cz, C2, CP1, CPz, CP2), Right central—RC (FC4, FC6, C4, C6, CP4, CP6), Right temporal—RT (FT10, FT8, T8, TP8, TP10), Left parietal—LP (P7, P5, P3, PO7, PO3), Medial parietal—MP (P1, Pz, P2, POz), Right parietal—RP (P4, P6, P8, PO4, PO8), Occipital—O (PO9, O1, Oz, O2, PO10).

Before further analysis, a scalp voltage processor 226 of the multi-scale brain functional connectivity analyzer 15 is used to obtain the current source density (CSD) using Laplacian theory (second spatial derivative) of the scalp voltage from the EEG signal for all the ROIs to provide spatial resolution using the CSD Toolbox in Matlab, for example.

Time-varying functional connectivity between all the selected ROIs using sliding time windows for processing is used. In most of the existing work, a fixed window size is used. A sliding window generator 230 is used to generate a window size denoted by L, and a whole set of window sizes L=25, 50, 100, 200, 400, 800, 1600, and 3200 samples, with the sampling period being $T_s$=2 ms, and perform a multi-scale evaluation of the time-varying connectivity for the brain network of each subject. The base-2 scaling of the window size is motivated by the discrete wavelet transformation. Denoting the length of the CSD signal as $T_c$, in the present case, $T_c$=55000 samples. For each fixed window size L, the CSD of each ROI is divided into successive, non-overlapping blocks of length L. Thereafter, a multi-scale function connectivity block 232 determines functional connectivity, which in this example uses a Pearson correlation among the time-synchronized blocks corresponding to all the ROI region pairs. In this way, for each region pair, instead of a single connectivity value, a Pearson correlation vector, denoted as $P=[P_1, P_2, \ldots, P_K]$, where $$K = \frac{T_c}{L}$$

is obtained. As can be seen, vector P elaborates how the functional connectivity between brain regions changes over time. The window size L determines the time and frequency resolutions of the Pearson correlation vector P. By calculating the Pearson correlation vector under different window sizes for each region pair, a multiscale evaluation of the time-varying functional connectivity of the ROI network is obtained.

Note that a total of 12 EEG-based ROIs are used, which implies there are 66 region pairs altogether. Therefore, for each subject, there are 66 Pearson correlation vectors. A time-frequency analysis is performed at a time frequency analyzer 238 for each Pearson correlation vector using the continuous Wavelet Toolbox in MATLAB, for example, and find the wavelet coefficients $C_{j,k}$, where j corresponds to frequency and k corresponds to time shift. For each of the 66 region pairs, the mean, minimum and maximum of $C_{j,k}$ with respect to k is determined. All of the 66×3 (mean, minimum, maximum of $C_{j,k}$)=198 are used as primitive features. This procedure is conducted for every window size L as denoted by the primitive features block 240 to obtains sets of primitive features, one for every window size. The sets 242 of primitive features for every window size is represented by the arrows.

Referring now FIG. 4, once the set of primitive features for each subject at each window size are obtained based on joint time-frequency-spatial analysis of the functional connectivity of the EEG-based ROI network in FIG. 2, discrimination is performed in the discriminator circuit 16. Due to the small size of the MCI sample set (especially naMCI), aMCI and naMCI are combined into one group for HC and MCI discrimination.

Traditionally, for a given participant, the discrimination result is generally a binary decision, which is also called hard decision, which is either HC or MCI. Soft discrimination is performed in addition to the binary decision of HC or MCI. The soft discrimination results provide an EEG-based cognitive status score, which potentially can be used as a predictor for the cognitive health of each participant. In the following, the soft discrimination procedure is summarized in four steps, where hard decision classifiers are first determined after which soft discrimination is performed through majority voting of a group of selected, reliable classifiers.

First, a feature selector 410 is used to obtain the discriminating features. A discriminating feature is one whose presence is more indicative of one sentiment over the other. For each fixed window size L, each primitive feature for all the 137 subjects is put together and screened using the t-test 410A, and only M out of the 198 primitive features with the smallest p-values are selected to formulate the feature vector in the vector formulator 412. Here L=25, 50, 100, 200, 400, 800, 1600, and 3200, and M=10, 15, 20, 25, 30, 35, 40, or 45. That is, each of them can take 8 possible values, and each (L, M) pair represents one configuration of the discrimination model. Therefore, all together, there are 8×8=64 possible hard decision discrimination approaches or hard classifiers.

In a second part of the discriminator 16, dimension reduction is performed. For each fixed (L, M) pair, the corresponding feature vector has length M. Using a regularized LDA (linear discriminant analysis) in a linear discriminant analyzer 414, the feature vector of each participant is mapped to a point in a one-dimensional subspace or axis, where the difference between HC and MCI subjects is maximized. Here, regularized LDA is used to reduce the noise effect (caused by both biological variability and measurement errors) in the size-limited data set.

A first layer discrimination using a single classifier 416 is performed. Decision trees are constructed based on the LDA output and conduct the classification using a classifier 416 such as an AdaBoost classifier, which has proven to be a highly effective classification tool.

The above linear discriminant analysis and classifier steps are repeated for all the (L, M) pairs, and therefore obtain a series of 64 classifiers or discrimination approaches, where each of them is a unique configuration of the discrimination model and has its own accuracy.

In the next part of the processing, soft discrimination of HC and MCI through majority voting of the selected classifiers is performed in the voting block 418 which has a summing block 420 to sum the contributions from the different size time windows. Note that each classifier has a different feature group from all the other classifiers and each feature reflects the difference between HC and MCI from a unique perspective. A group of N reliable classifiers (i.e., the N classifiers with the highest accuracy, here N is an odd number) is selected and the final discrimination of HC and MCI through weighted majority voting is performed. More specifically, for n=1, 2, . . . , N, denote the vote of voter n as $v_n$, where $v_n$=+1 if the decision is HC and $v_n$=−1 if the decision is MCI. Denoting the accuracy of voter n by an, then for each subject, in addition to the binary output of HC or MCI, a soft discrimination output $$s = \frac{1}{N}\sum_{n=1}^{N} a_n v_n,$$

which is an EEG-based cognitive status score of the participant is obtained and can be used to predict how likely the subject is to progress from HC to MCI, or from MCI to AD. The display 18 generates a screen display that may provide the soft score or an indicator of mild cognitive impairment or both. In this example both are set forth. The patient score of −0.0876 and "indicator of mild cognitive impairment" is provided as the output to a medical professional.

The effectiveness of majority voting can be roughly illustrated through the following result: assuming there are N (where N is an odd number) independent voters, all with classification accuracy a, then the probability that the majority voting delivers the correct result, $p_c$, is given by:

$$p_c = prob\{\text{majority voting result is correct}\} = \sum_{k=m}^{N} \binom{N}{k} a^k (1-a)^{N-k}$$

where $$m = \frac{N+1}{2}$$

(note that N is odd) is the smallest number of correct voters needed for the majority voting result to be correct. The value of $p_c$ under different number of voters and voter accuracy is illustrated in FIG. 5 which shows majority voting accuracy versus the number of independent voters. As can be seen, the majority voting accuracy increases with the number of independent voters when individual voter accuracy is reasonably high (e.g., a >0.6). For example, if a=0.70 and N=25, then $p_c$=0.98. As can be seen, when the individual voter accuracy is reasonably high (e.g., a >0.60), majority voting can improve the discrimination accuracy significantly when the number of voters is sufficiently large.

In this example case, even though the voters (i.e., the selected classifiers) are not completely independent, each classifier relies on a different feature group from all the other classifiers. As set forth below, majority voting can improve the discrimination sensitivity and stability significantly.

The odd number of classifiers is selected here to avoid the situation where there are an equal number of positive and negative votes. However, since the soft score also takes the accuracy of each classifier into consideration, an even number of voters may work as well since the voters are unlikely to have identical accuracy.

The discrimination process for all the individual classifiers corresponding to each (L, M) pair was conducted, where L=25, 50, 100, 200, 400, 800, 1600, 3200 is the window size and M=10, 15, 20, 25, 30, 35, 40, 45 is the number of features with the smallest p-values selected. To assess the accuracy of the classifiers, the traditional leave-one-out test as well as the k-fold (with k=10, 5, 3) cross-validation technique was used. This is because in addition to leave-one-out or 10-fold (i.e., leave-10%-out) cross-validation, a clinically desirable test would utilize 5-fold or even 3-fold cross-validations.

In the k-fold cross-validation, the data is split into k equally sized subsets, which are also called "folds." One of the k-folds will function as the test set, also known as the holdout set or validation set, and the remaining folds will train the model. This process is repeated until each fold has functioned as a holdout fold. When all iterations have been completed, the accuracy scores for all the test sets are averaged to evaluate the performance of the classifier.

For more accurate assessment of the discrimination model, random shuffles are applied to enhance the dataset cardinality (i.e., the number of patients in that dataset) in the k-fold cross-validation. More specifically, for each k, the k-fold cross-validation is repeated 10 times, and each time, the dataset is randomly shuffled to ensure sufficient diversity in the k-fold test.

The discrimination accuracy tables of the individual classifiers for leave-one-out, 10-fold, 5-fold, and 3-fold cross-validations are shown in FIGS. 6A-6D. FIGS. 6A-6D provides a plurality of graphs that illustrate discrimination results for individual classifiers: FIG. 6A shows a leave-one-out cross-validation; FIG. 6B illustrates a 10-fold cross-validation; FIG. 6C shows a 5-fold, cross-validation; and FIG. 6D provides a 3-fold cross-validation. Each individual classifier is uniquely determined by the window size and the number of features used and has its own accuracy. As can be seen, the size of the training set is gradually reduced and the holdout set is extended, the discrimination result downgrades slightly but demonstrates relatively high stability in the tests. The 21 classifiers which deliver the highest accuracy in leave-one-out cross-validation are selected as the voters and marked by the red boxes. As can be seen, as the size of the training set is reduced and the size of the test set is increased, the accuracy scores of the classifiers may decrease slightly, but demonstrate relatively high stability in the tests.

Note that the method is based on joint time-frequency-spatial analysis, and the frequency considered here is the frequency of the time-variant functional connectivity in terms of Pearson correlation and is not directly related to the frequency of EEG or CSD signals over which the traditional brain wave bands (delta, theta, alpha, beta, etc.) are defined.

However, some interesting relationships were observed between the result and existing findings. In literature, it was pointed out that as most consistent findings, AD patients with mild cognitive impairment and dementia showed abnormalities in peak frequency, power, and "interrelatedness" resting state EEG measures (e.g., directed transfer function, phase lag index, linear lagged connectivity, etc.) at delta (0.5-4 Hz), theta (4-8 Hz) and alpha (8-12 Hz) rhythms in relation to disease progression and interventions.

From FIGS. 6A-6D, where the discrimination results for individual classifiers are presented, it can be seen that the most reliable voters lie in the window size L=50, 100, 200, . . . , 1600. Recall that the sampling period is 2 ms, roughly speaking, the window size set L=50, 100, 200, . . . , 1600 corresponds to the frequency range of 0.31 Hz-10 Hz, which also spans over the delta, theta and alpha range and is consistent with existing findings. Moreover, in literature, it was pointed out that Theta frequency is the earliest and most sensitive EEG marker of AD pathology. It is interesting to note that in the study, window size L=100 (which corresponds to the Theta band) contributes most of the reliable voters among all the selected window sizes.

Recall that the new biomarkers introduced in this disclosure reflect how the functional connectivity is changing in both the time and frequency domains across the EEG-based ROIs in HC and MCI. The underlying relationship between these new biomarkers and existing resting state EEG biomarkers for AD deterioration still needs to be further analyzed.

N=21 classifiers were selected which deliver the highest accuracy in leave-one-out cross-validation as the voters, as marked by the bold boxes in FIGS. 6A-6D. The same group of voters is used for the soft discrimination of HC and MCI for leave-one-out, 10-fold, 5-fold and 3-fold cross-validations, and the results based on weighted majority voting are shown in FIG. 7 through the confusion matrices. FIG. 7 provides majority voting results in a series of matrices—the confusion matrices for: (a) leave-one-out; (b) 10-fold; (c) 5-fold; (d) 3-fold. To enhance the dataset cardinality, 10 random shuffles were applied for 10-fold, 5-fold and 3-fold cross-validations. As can be seen, the soft discrimination model achieves high accuracy (>91%) for leave-one-out and K-fold (K=10, 5, 3) cross-validations. The leave-one-out discrimination accuracy is also compared for female and male, and no significant differences are observed.

As can be seen, the voting-based soft discrimination achieves high accuracy (>91%) for leave-one-out and K-fold (K=10, 5, 3) cross-validations, and demonstrates significantly higher sensitivity and stability than the individual classifiers as the training set is gradually downsized and the test set extended. It is interesting to note that 10-fold cross-validation shows a higher accuracy than leave-one-out. This is because the dataset is oversampled when it is randomly shuffled 10 times, which increases the resolution of the accuracy scores. The leave-one-out discrimination accuracy for female and male was used, and no significant differences are observed.

Referring now to FIGS. 8A and 8B which provides a plurality of graphs of soft discrimination of HC and MCI based on leave-one-out cross-validation. FIG. 8A provides a graph illustrating soft discrimination scores in ascending order. Here "+1" represents pure HC, and "−1" represents pure MCI. Each participant receives a soft score s within (−1, +1), where a positive s implies that the decision is HC, and a negative s implies that the decision is MCI. At the same time, the soft score s may also serve as indicator of the cognitive health level in the sense that the larger the s, the better the cognitive status. Potentially, the soft discrimination score makes it possible to predict the personal progression trends for MCI. FIG. 8B provides a graph of the distribution of the soft discrimination scores. As expected, incorrect prediction happens mainly when the soft discrimination score is within the range [−0.2, 0.2], where the differences between low-scoring HC and high-scoring MCI are not significant.

The soft discrimination score for each participant is shown in FIG. 8A Note that "+1" represents pure HC, and "−1" represents pure MCI. Each participant receives a score s within (−1, +1), where a positive s implies that the decision is HC, and a negative s implies that the decision is MCI. At the same time, the soft score s also serves as an indicator of the cognitive status level in the sense that the larger the s, the better the cognitive health. For example, a score of 0.83 would indicate that the participant is in a very optimistic HC condition, and a score of 0.12 would indicate that although the participant is classified as HC, however, there is a trend that the participant may progress to the MCI condition. Similar interpretation applies to the negative scores. In other words, the soft discrimination score may be used to predict whether an HC participant is likely to progress to MCI, which is critical for timely intervention or treatment to prevent the cognitive condition from getting worse.

The distribution of the soft discrimination scores is shown in FIG. 8B. As expected, errors occur mainly in the score range [−0.2, 0.2], where the differences between low-scoring HC and high-scoring MCI are not that significant.

Out of the total 137 participants, access to the follow-up MADRC consensus diagnosis result of 74 of them is obtained. Out of these 74 participants, there are 26 of them who have at least one follow-up consensus diagnosis made by MADRC in about 12-18 months after the EEG test.

Note that the soft-decision scores are obtained based on the EEG data, the possibility of predicting the temporal progression trend of each participant in 12-18 months after the EEG test is explored. For each participant who has been correctly classified, based on whether the progression trend is predicted correctly or incorrectly, the result as "Correct trend" or "Incorrect trend", respectively. When the discrimination decision is incorrect, it is marked "misclassified."

Out of the 26 subjects, the correct trend (i.e., subjects with progression trend predicted correctly): 22 out of 26, 84.61%; Incorrect trend (i.e., subjects with progression trend predicted incorrectly): 3 out of 26, 11.54%; Misclassified: 1 out of 26, 3.85%. It is worth noting that one subject received a soft score of 0.114, which puts the subject in the HC group but indicates that the subject is more likely to progress to MCI. The prediction is validated in the follow-up visit one year later and therefore this one is marked as "Correct trend." Due to high uncertainty and instability in the cognitive condition of the senior population group, the prediction has been limited to 12-18 months in this example.

From FIGS. 9A-9D, the selected voters are all corresponding to window sizes L=50, 100, 200, 400, 800, 1600, and no features are selected from window sizes L=25 or 3200. This is because when the window size is too small, the corresponding Pearson correlation vector cannot really reflect the statistical property of the functional connectivity between region pairs; when the window size is too large, the Pearson correlation vector cannot accurately capture the time-varying property of the functional connectivity.

The analysis indicates that the region pairs which occur most frequently in the features (for L=50, 100, 200, 400, 800, 1600) are: Right parietal (RP)↔Occipital (Occ), Left temporal (LT)↔Right parietal (RP), Left temporal (LT) ↔Right central (RC), Left temporal (LT) ↔Medial parietal (MP).

The frequency that each ROI region occurs in the selected features are shown in FIGS. 9A-9D. FIGS. 9A-9D provide a plurality of graphs illustrating frequency of occurrence of all the ROI regions in the 45 selected features. FIGS. 9A-9D illustrate window size L=50, 100, 200. FIGS. 9C-9D illustrate window size L=400, 800, 1600 whereby these figures illustrate the concept of multiscale functional connectivity analysis in both time and frequency domains and also show the reciprocal relationship between the window size and frequency range of the features. Moreover, the Medial parietal (MP), Left temporal (LT), Right central (RP), Occipital (Occ) turn out to be the ROI regions that appear most frequently in the selected features, indicating that these regions play significant roles in differentiating HC and MCI in information transmission and receiving during the resting-state. As can be seen, Right parietal (RP), Medial parietal (MP), Left temporal (LT), Occipital (Occ) turn out to be the ROI regions that appear most frequently in the features, indicating that these regions play significant roles in identifying the differences in resting-state brain connectivity between HC and MCI. Brain regions that were found to be most important in the ROI analysis were those that are most often cited as involved in the MCI and AD deterioration (e.g., temporal, parietal and occipital). It also should be noted that EEG electrodes do reflect surrounding area activities to some degree.

From FIGS. 9A-9D, the reciprocal relationship between the window size and frequency range of the features can also be observed, illustrating the concept of multiscale functional connectivity analysis in both time and frequency domains.

In summary, a first contribution of this disclosure is the concept of multiscale time-varying functional connectivity, which breaks the barriers of fixed window size in the sliding window approach and brings the long-lasting discussion on how to select the window size to an end. Adopting multiple time window sizes allows us to develop a whole series of discrimination approaches, each of which represents a unique time window size and feature group configuration of the discrimination model and has its own accuracy. This therefore provides a large pool of HC and MCI classifiers from which to select.

Another contribution Is the use of a highly sensitive and reliable soft discrimination model for HC and MCI based on the pool of HC and MCI classifiers. By choosing a diversified group of reliable classifiers as voters, a soft discrimination score was obtained for each participant through weighted majority voting of all these voters. The soft score not only can provide a hard binary decision on HC or MCI but can also serve as an indicator of the participant's cognitive health status. The preliminary results on 12-18 months progression trend prediction indicated that the soft score shows promising capability in predicting the personal progression trend of the cognitive health in older adults, especially African American seniors, and therefore may enable the early detection of people at risk of cognitive impairment even before the MCI symptoms may appear. This is crucial in preventing pathological cognitive decline from a very early stage and reducing the risk of AD and related dementias.

Upon further demonstration, the discrimination model, which is based on a short segment (110 seconds) of resting-state EEG, may be implemented in a cost-effective, highly sensitive, non-invasive, and personalized assessment tool for early detection of people at risk of cognitive impairment, which can promote cognitive resiliency in seniors, especially older African American individuals.

The present disclosure addresses both underfitting and overlifting. Underfitting and overfitting are two main problems in machine learning which degrade the performance of the machine learning model. Underfitting happens when a model is over-simplified and is unable to capture the underlying pattern of the data. An underfit model has poor performance on the training data and will also result in unreliable predictions on the new data. On the other hand, overfitting happens when the model captures the noise along with the underlying pattern in data, generally because the model is too complex and/or the dataset is too noisy. An overfit model tends to perform well for training data but has poor performance with the test data and is generally more difficult to identify than underfitting. For these reasons, the k-fold cross-validation technique is often applied to evaluate the performance of machine learning models.

In the present system, underfitting and overfitting problems are reduced by including both simple classifiers (i.e., the ones with fewer features) and complex classifiers (i.e., the ones with more features) into the voter group. After majority voting, both the sensitivity and stability of the soft discrimination classifier are significantly improved, and the model does demonstrate stable performance in leave-one-out, 10-fold, 5-fold and 3-fold cross-validations. Given the biological complexity and variability of human brain, the sample size of 137 participants may not be sufficient to capture the patterns of the brain networks of HC and MCI, and larger scale training may still be needed before practical application of the model.

Overall, the present disclosure is expected to play a significant and critical role in the study of neurodegenerative mechanisms and interventions to promote cognitive resiliency, especially for minority populations who may face challenges in acquiring proper health care.

In one form of the present disclosure, innovative techniques for multiscale time-varying functional connectivity are used. Instead of using a fixed observation window size as in traditional evaluation tools for time-varying functional connectivity, a whole set of different window sizes is used and therefore the dynamics of the functional connectivity at different frequency resolutions are captured. This allows us to develop a whole series of discrimination approaches, each of which represents a unique configuration of the discrimination model and has its own accuracy. Therefore, this provides a large pool of HC and MCI classifiers from which to select.

In another aspect of the present disclosure, the concept of soft discrimination of healthy controls (HC) and patients with mild cognitive impairments (MCI) is used. Unlike existing work which generally relies only on one detection approach, the soft discrimination of HC and MCI is obtained through weighted majority voting of a selected group of reliable discrimination approaches. This combination of diversified approaches takes the discrepancies between HC and MCI from different perspectives into consideration, and greatly improves the accuracy, stability, and reliability of the present model. Moreover, in addition to a binary HC or MCI decision, each participant receives a soft score which potentially could also serve as indicator of the cognitive health level in the sense that the higher the score, the better the cognitive status.

In another form of the present disclosure, proactive prediction of mild cognitive impairment is performed before clinical MCI symptoms may first appear. Existing work on predictive models in the Alzheimer's disease (AD) area has been focused on the prediction of the conversion or progression from MCI to AD or dementia, where the major goal is to identify which individuals with MCI are more likely to develop dementia. Note that AD generally leads to irreversible deterioration of cognition, the lack of success in AD treatment indicates that the current intervention may be too late to be efficient, and therefore calls for proactive prediction of people at risk of MCI before clinical symptoms may occur. The preliminary results on 12-18 months progression trend prediction indicated that the soft score obtained from the discrimination model shows promising capability in predicting the personal progression trend of the cognitive health in African American seniors, and therefore may enable the early detection of people at risk of cognitive impairment even before the MCI symptoms may appear.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of assessing brain impairment comprising:
generating electroencephalogram (EEG) signals from a plurality of electrodes;
removing artifacts segments with or lack of activity from the EEG signals to generate reduced signals;
generating current source density signals from the reduced signals;
performing multiscale analysis of dynamic functional connectivity of a brain based on the current source density signals using a plurality of different sized time windows;
generating hard classifiers for each of the plurality of different sized time windows;
selecting classifiers from the hard classifiers to form selected classifiers;
performing majority voting on a discrimination of normal cognition and mild cognitive impairment using the selected classifiers;
generating an EEG-based health score of overall brain activity based on the majority voting of the selected classifiers; and
generating a display corresponding to the health score of overall brain activity.

2. The method of claim 1 wherein removing artifacts comprises removing segments of the EEG signals contaminated by artifacts.

3. The method of claim 2 wherein removing segments of the EEG signals contaminated by artifacts comprises at least one of removing segments comprising saturation, and rejecting segments comprising out of range voltages.

4. The method of claim 1 wherein generating EEG signals comprises generating EEG signals from regions of interest of the brain comprising at least right frontal, medial frontal, left frontal, left temporal, left central, medial central, right central, right temporal, left parietal, medial parietal, right parietal and occipital.

5. The method of claim 1 wherein selecting classifiers comprises selecting classifiers by linear discriminant analysis.

6. The method of claim 1 wherein performing multiscale analysis comprises generating a plurality of primitive features corresponding to the plurality of different sized time windows.

7. The method of claim 6 wherein the plurality of primitive features comprise means, minimums, and maximums.

8. The method of claim 6 further comprising generating correlation vectors using the current source density signals.

9. The method of claim 8 further comprising generating the plurality of primitive features based on the correlation vectors.

10. The method of claim 1 wherein generating EEG signals comprises generating resting-state EEG signals.

\* \* \* \* \*